(12) United States Patent
Wang et al.

(10) Patent No.: US 11,941,323 B2
(45) Date of Patent: Mar. 26, 2024

(54) MEME CREATION METHOD AND APPARATUS

(71) Applicant: HUAWEI TECHNOLOGIES CO., LTD., Shenzhen (CN)

(72) Inventors: Meng Wang, Shenzhen (CN); Zhuo Wang, Shenzhen (CN); Fan Fan, Shenzhen (CN); Lelin Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 17/836,212

(22) Filed: Jun. 9, 2022

(65) Prior Publication Data
US 2022/0300251 A1  Sep. 22, 2022

Related U.S. Application Data

(63) Continuation of application No. PCT/CN2020/135041, filed on Dec. 9, 2020.

(30) Foreign Application Priority Data

Dec. 10, 2019 (CN) .......................... 201911261292.3

(51) Int. Cl.
*G10L 15/08* (2006.01)
*G06F 3/0482* (2013.01)
(Continued)

(52) U.S. Cl.
CPC ............ *G06F 3/167* (2013.01); *G06F 3/0482* (2013.01); *G06F 18/22* (2023.01); *G06T 11/203* (2013.01);
(Continued)

(58) Field of Classification Search
CPC ........ G06F 3/167; G06F 3/0482; G06F 18/22; G06F 3/0488; G06F 16/68; G06F 16/686;
(Continued)

(56) References Cited

U.S. PATENT DOCUMENTS 6,963,839 B1 * 11/2005 Ostermann ............. G10L 13/08
704/E13.011
8,170,872 B2 * 5/2012 Lyle ........................ H04L 51/04
704/235
(Continued)

FOREIGN PATENT DOCUMENTS

CN  101072207 A  11/2007
CN  102541259 A   7/2012
(Continued)

*Primary Examiner* — Hien L Duong
(74) *Attorney, Agent, or Firm* — Maier & Maier, PLLC

(57) ABSTRACT

A meme creation method and apparatus are provided, and relate to the terminal field, to enrich forms and content of memes, and improve user experience. The method includes: displaying a first interface, where the first interface includes a speech input button; receiving, in response to an operation of triggering the speech input button by a user, a speech input by the user; recognizing the speech in a preset manner, where recognition in the preset manner includes at least content recognition, and if the speech includes a target keyword, recommending a first image meme set to the user; obtaining, in response to an operation of selecting one image meme from the first image meme set by the user, a target meme based on the image meme selected by the user and the speech or semantics corresponding to the speech; and sending the target meme.

15 Claims, 28 Drawing Sheets

(51) Int. Cl.
  *G06F 3/16* (2006.01)
  *G06F 18/22* (2023.01)
  *G06T 11/20* (2006.01)
  *G10L 15/22* (2006.01)
  *G10L 19/00* (2013.01)
  *G10L 25/63* (2013.01)

(52) U.S. Cl.
  CPC .............. *G10L 15/08* (2013.01); *G10L 15/22* (2013.01); *G10L 19/00* (2013.01); *G10L 25/63* (2013.01); *G06T 2200/24* (2013.01); *G10L 2015/088* (2013.01); *G10L 2015/223* (2013.01)

(58) Field of Classification Search
  CPC ... G06T 11/203; G06T 2200/24; G06T 11/60; G10L 15/08; G10L 15/22; G10L 19/00; G10L 25/63; G10L 2015/088; G10L 2015/223; G10L 21/0208; G10L 13/08; G10L 25/51; G10L 2015/225
  See application file for complete search history.

(56) References Cited

U.S. PATENT DOCUMENTS

| | | | | |
|---|---|---|---|---|
| 10,761,680 | B2* | 9/2020 | Lee | G06Q 50/01 |
| 11,093,712 | B2* | 8/2021 | Lam | G06F 40/289 |
| 11,758,231 | B2* | 9/2023 | Laverty | H04N 21/47202 |
| | | | | 348/157 |
| 2013/0332168 | A1* | 12/2013 | Kim | G06F 16/632 |
| | | | | 704/251 |
| 2014/0181229 | A1* | 6/2014 | Tucker | H04L 12/1827 |
| | | | | 709/206 |
| 2015/0206525 | A1* | 7/2015 | Ryder | G06F 16/9038 |
| | | | | 704/260 |
| 2015/0212722 | A1* | 7/2015 | Leung | G06F 3/016 |
| | | | | 726/19 |
| 2016/0080298 | A1* | 3/2016 | Oh | H04L 51/063 |
| | | | | 709/206 |
| 2016/0205049 | A1* | 7/2016 | Kim | H04L 51/216 |
| | | | | 455/414.1 |
| 2016/0210116 | A1* | 7/2016 | Kim | G06F 40/274 |
| 2016/0210279 | A1* | 7/2016 | Kim | G06F 40/30 |
| 2016/0210962 | A1* | 7/2016 | Kim | G06F 40/30 |
| 2016/0211001 | A1* | 7/2016 | Sun | G11B 27/036 |
| 2016/0247500 | A1* | 8/2016 | Ryder | G10L 21/10 |
| 2017/0308289 | A1* | 10/2017 | Kim | G06F 3/0237 |
| 2018/0061407 | A1* | 3/2018 | Qin | G06F 3/04817 |
| 2018/0130459 | A1 | 5/2018 | Paradiso et al. | |
| 2018/0255009 | A1* | 9/2018 | Chen | G06Q 50/01 |
| 2018/0343336 | A1* | 11/2018 | Oh | H04M 1/72439 |
| 2019/0007352 | A1* | 1/2019 | Doh | H04L 51/04 |
| 2019/0079644 | A1* | 3/2019 | Kim | G06N 20/00 |
| 2020/0258517 | A1* | 8/2020 | Park | G10L 15/22 |
| 2021/0037293 | A1* | 2/2021 | Aher | G06F 16/9538 |
| 2021/0142820 | A1* | 5/2021 | Raikar | G10L 25/63 |
| 2021/0334068 | A1* | 10/2021 | Rangaraju | G06F 3/04817 |
| 2022/0171507 | A1* | 6/2022 | Kang | H04L 51/52 |

FOREIGN PATENT DOCUMENTS

| | | |
|---|---|---|
| CN | 106531149 A | 3/2017 |
| CN | 106570106 A | 4/2017 |
| CN | 106789581 A | 5/2017 |
| CN | 107369196 A | 11/2017 |
| CN | 107423277 A | 12/2017 |
| CN | 107450746 A | 12/2017 |
| CN | 108320316 A | 7/2018 |
| CN | 109165072 A | 1/2019 |
| CN | 109524027 A | 3/2019 |
| CN | 110297928 A | 10/2019 |

* cited by examiner

MEME CREATION METHOD AND APPARATUS

CROSS-REFERENCE TO RELATED APPLICATIONS

This application is a continuation of International Application No. PCT/CN2020/135041, filed on Dec. 9, 2020, which claims priority to Chinese Patent Application No. 201911261292.3, filed on Dec. 10, 2019. The disclosures of the aforementioned applications are hereby incorporated by reference in their entireties.

TECHNICAL FIELD

The embodiments relate to the terminal field, and a meme creation method and apparatus.

BACKGROUND

With popularization of terminal devices such as a mobile phone, a tablet, and a personal computer (PC) and development of social software, memes (image memes/meme packages) are increasingly widely used. A user can send a meme in social software such as chat software by using a terminal device such as a mobile phone. The meme, with a series of matching words, uses a popular star, a speech record, an animation, or a movie screenshot as a material, so that emotion can be expressed. In addition, the meme has features such as a high recognition degree, high emotionality, and self-transmission (seeing-liking-adding to favorites-forwarding). This can avoid misunderstanding caused by words.

However, currently, the memes are mainly static or dynamic pictures, and forms and content of the memes are monotonous.

SUMMARY

The embodiments provide a meme creation method and apparatus, to enrich forms and content of memes, and improve user experience.

According to a first aspect, an embodiment provides a meme creation method, where the method is applied to an electronic device. The method includes: displaying a first interface, where the first interface includes a speech input button; receiving, in response to an operation of triggering the speech input button by a user, a speech input by the user; recognizing the speech in a preset manner, where recognition in the preset manner includes at least content recognition, and if the speech includes a target keyword, recommending a first image meme set to the user, where a first meme label of each image meme in the first image meme set has a matching relationship with the target keyword; and obtaining, in response to an operation of selecting one image meme from the first image meme set by the user, a target meme based on the image meme selected by the user and the speech or semantics corresponding to the speech.

According to the method provided in this embodiment, after receiving the speech input by the user, a mobile phone may perform content recognition on the speech. If the speech includes the target keyword, the mobile phone recommends the first image meme set to the user. The first meme label of each image meme in the first image meme set has the matching relationship with the target keyword. In this manner of automatically recommending an image meme based on the speech input by the user, a user operation can be simplified, and the user does not need to select the image meme from massive image memes, so that the user operation is more convenient. Then, in response to the operation of selecting one image meme from the first image meme set by the user, the target meme may be obtained based on the image meme selected by the user and the speech. In this way, the target meme includes both speech information and image information, so that information transmission is more natural, and emotion expression is more real. Alternatively, the mobile phone may embed the semantics corresponding to the speech into the image meme selected by the user, to obtain the target meme. In this way, the target meme includes both the image information and the semantics corresponding to the speech (word information), so that intent of the user can be transferred and expressed more accurately, and user experience can be improved.

In a possible implementation, the recognition in the preset manner further includes emotion recognition; and if the speech belongs to a target emotional color, a second meme label of each image meme in the first image meme set has a matching relationship with the target emotional color. In this way, a meme can be recommended to the user more accurately, and user experience can be improved.

In a possible implementation, before content recognition is performed on the speech, the method further includes: displaying first prompt information, where the first prompt information prompts the user whether an image meme needs to be recommended based on the speech; and receiving an operation of recommending the image meme based on the speech that is triggered by the user.

In a possible implementation, before the obtaining a target meme based on the image meme selected by the user and the speech or semantics corresponding to the speech, the method further includes: displaying second prompt information in response to the operation of selecting one image meme from the first image meme set by the user, where the second prompt information prompts the user whether to create a speech meme or a word meme. If the user chooses to create the speech meme, the target meme may be obtained based on the image meme selected by the user and the speech. If the user chooses to create the word meme, the target meme may be obtained based on the image meme selected by the user and the semantics corresponding to the speech.

In a possible implementation, the displaying a first interface includes: displaying a dialog interface with a target contact; or displaying a content sharing interface; or displaying a comment interface.

In a possible implementation, the method further includes: sending the target meme to an electronic device corresponding to the target contact; or uploading the target meme to a server corresponding to an application program that provides the content sharing interface or the comment interface.

In a possible implementation, the obtaining a target meme based on the image meme selected by the user and the speech includes: encoding and compressing the speech, and adding a preset identifier to a preset position of the image meme selected by the user, where the preset identifier indicates that the target meme is a speech meme; and loading, as video formats, an encoded and compressed speech and the image meme to which the preset identifier is added, to obtain the target meme.

In a possible implementation, the obtaining a target meme based on the image meme selected by the user and semantics corresponding to the speech includes: converting all words corresponding to the speech or the target keyword into pixel information; and loading the pixel information into a preset area or a blank area of the image meme selected by the user.

In a possible implementation, the method further includes: displaying a preview interface, where the preview interface includes the target meme, the preset identifier or the semantics corresponding to the speech is included at a preset position of the target meme, and the preset identifier indicates that the target meme is a speech meme. In this way, the user may preview the target meme in the preview interface and may further set the target meme.

In a possible implementation, if the preset identifier is included at the preset position of the target meme, the method further includes: receiving an operation of triggering the target meme by the user, and playing, in response to the operation of triggering the target meme by the user, a speech carried by the target meme.

In a possible implementation, the method further includes: performing preset sound effect processing on the speech, where the preset sound effect processing includes at least one of male-voice processing, female-voice processing, animation figure voice processing, dialect processing, funny voice processing, or celebrity voice processing. In this way, personalized requirements of the user can be met, and user experience can be improved.

In a possible implementation, the performing preset sound effect processing on the speech includes: performing preset sound effect processing on the speech based on a third meme label of the image meme selected by the user, where the third meme label indicates a type of the image meme selected by the user; and if the third meme label of the image meme selected by the user indicates a preset character type, processing the speech based on a sound feature of the preset character type; or if the third meme label of the image meme selected by the user indicates a preset animal type, performing funny voice processing or animation figure voice processing on the speech. In this way, the type of the image meme can better match a sound effect of the speech, and user experience can be improved.

In a possible implementation, the method further includes: receiving an operation of selecting a picture by the user and loading a target area in the picture to the preset position of the image meme selected by the user or the target meme.

In a possible implementation, if the user does not select one image meme from the first image meme set, the method further includes: displaying a drawing board interface in response to an operation of triggering a customized meme mode by the user; receiving a doodle operation input by the user in the drawing board interface; generating a stick figure based on a moving track of the doodle operation; and recommending an image meme whose similarity to a contour of the stick figure is greater than a preset threshold to the user. In this way, the user requirements can be better adapted, and user experience can be improved.

In a possible implementation, if the user does not select one image meme from at least one image meme, the method further includes: receiving an operation of selecting one image meme from locally stored image memes by the user.

According to a second aspect, an embodiment provides a meme creation method, where the method is applied to an electronic device. The meme creation method includes: displaying a second interface, where the second interface includes an image meme selection button; displaying at least one image meme in response to an operation of triggering the image meme selection button by a user; receiving an operation of selecting one image meme from the at least one image meme by the user; displaying prompt information, where the prompt information prompts the user whether a speech meme needs to be created; in response to an operation of determining to create a speech meme by the user, generating a speech based on words on the image meme selected by the user or text input by the user; and obtaining a speech meme based on the image meme selected by the user and the speech.

According to the method provided in this embodiment, after receiving the operation of selecting the image meme by the user, a mobile phone may generate the speech based on the words on the image meme or the text input by the user and obtain the speech meme based on the speech and the image meme, and the user does not need to input a speech. This simplifies operation steps of the user, the speech meme can be conveniently and intelligently generated, forms and content of memes are enriched, and user experience can be improved.

According to a third aspect, an embodiment provides an electronic device. The electronic device includes: a display unit, configured to display a first interface, where the first interface includes a speech input button; a receiving unit, configured to receive, in response to an operation of triggering the speech input button by a user, a speech input by the user; a recognition unit, configured to: recognize the speech in a preset manner, where recognition in the preset manner includes at least content recognition, and if the speech includes a target keyword, recommend a first image meme set to the user, where a first meme label of each image meme in the first image meme set has a matching relationship with the target keyword; and a processing unit, configured to obtain, in response to an operation of selecting one image meme from the first image meme set by the user, a target meme based on the image meme selected by the user and the speech or semantics corresponding to the speech.

In a possible implementation, the recognition in the preset manner further includes emotion recognition; and if the speech belongs to a target emotional color, a second meme label of each image meme in the first image meme set has a matching relationship with the target emotional color.

In a possible implementation, the display unit is further configured to: display first prompt information, where the first prompt information prompts the user whether an image meme needs to be recommended based on the speech; and receive an operation of recommending the image meme based on the speech that is triggered by the user.

In a possible implementation, the display unit is further configured to display second prompt information in response to the operation of selecting one image meme from the first image meme set by the user, where the second prompt information prompts the user whether to create a speech meme or a word meme.

In a possible implementation, the display unit is configured to: display a dialog interface with a target contact; or display a content sharing interface; or display a comment interface.

In a possible implementation, the electronic device further includes a sending unit, configured to: send the target meme to an electronic device corresponding to the target contact; or upload the target meme to a server corresponding to an application program that provides the content sharing interface or the comment interface.

In a possible implementation, the processing unit is configured to: encode and compress the speech, and add a preset identifier to a preset position of the image meme selected by the user, where the preset identifier indicates that the target meme is a speech meme; and load, as video formats, an encoded and compressed speech and the image meme to which the preset identifier is added, to obtain the target meme.

In a possible implementation, the processing unit is configured to: convert all words corresponding to the speech or the target keyword into pixel information; and load the pixel information into a preset area or a blank area of the image meme selected by the user.

In a possible implementation, the display unit is further configured to display a preview interface, where the preview interface includes the target meme, the preset identifier or the semantics corresponding to the speech is included at a preset position of the target meme, and the preset identifier indicates that the target meme is a speech meme.

In a possible implementation, if the preset identifier is included at the preset position of the target meme, the electronic device further includes a playing unit, configured to: receive, by using the receiving unit, an operation of triggering the target meme by the user; and play, in response to the operation of triggering the target meme by the user, a speech carried by the target meme.

In a possible implementation, the processing unit is further configured to perform preset sound effect processing on the speech, where the preset sound effect processing includes at least one of male-voice processing, female-voice processing, animation figure voice processing, dialect processing, funny voice processing, or celebrity voice processing.

In a possible implementation, the processing unit is configured to perform preset sound effect processing on the speech based on a third meme label of the image meme selected by the user, where the third meme label indicates a type of the image meme selected by the user; and if the third meme label of the image meme selected by the user indicates a preset character type, process the speech based on a sound feature of the preset character type; or if the third meme label of the image meme selected by the user indicates a preset animal type, perform funny voice processing or animation figure voice processing on the speech.

In a possible implementation, the processing unit is further configured to: receive, by using the receiving unit, an operation of selecting a picture by the user; and load a target area in the picture to the preset position of the image meme selected by the user or the target meme.

In a possible implementation, if the user does not select one image meme from the first image meme set, the display unit is further configured to display a drawing board interface in response to an operation of triggering a customized meme mode by the user; the receiving unit is further configured to receive a doodle operation input by the user in the drawing board interface; the processing unit is further configured to generate a stick figure based on a moving track of the doodle operation; and the recommendation unit is further configured to recommend an image meme whose similarity to a contour of the stick figure is greater than a preset threshold to the user.

In a possible implementation, if the user does not select one image meme from at least one image meme, the receiving unit is further configured to receive an operation of selecting one image meme from locally stored image memes by the user.

According to a fourth aspect, an embodiment provides an electronic device. The electronic device includes: a display unit, configured to display a second interface, where the second interface includes an image meme selection button, and the display unit is further configured to display at least one image meme in response to an operation of triggering the image meme selection button by a user; a receiving unit, configured to receive an operation of selecting one image meme from the at least one image meme by the user, where the display unit is further configured to display prompt information, and the prompt information prompts the user whether a speech meme needs to be created; and a processing unit, configured to: in response to an operation of determining to create a speech meme by the user, generate a speech based on words on the image meme selected by the user or text input by the user; and obtain a speech meme based on the image meme selected by the user and the speech.

According to a fifth aspect, an embodiment provides a computer-readable storage medium including instructions. When the instructions are run on a computer, the computer is enabled to perform the method provided in any one of the foregoing aspects.

According to a sixth aspect, an embodiment provides a computer program product including instructions. When the computer program product runs on a computer, the computer is enabled to perform the method provided in any one of the foregoing aspects.

According to a seventh aspect, an embodiment provides a chip system. The chip system includes a processor, and may further include a memory, configured to implement the method provided in any one of the foregoing aspects. The chip system may include a chip or may include a chip and another discrete device.

According to an eighth aspect, an embodiment further provides a meme creation apparatus. The meme creation apparatus may be a processing device, an electronic device, or a chip. The apparatus includes a processor, configured to implement the method provided in any one of the foregoing aspects. The apparatus may further include a memory, configured to store program instructions and data. The memory may be a memory integrated into the apparatus, or an off-chip memory disposed outside the apparatus. The memory is coupled to the processor, and the processor may invoke and execute the program instructions stored in the memory, to implement the method provided in any one of the foregoing aspects. The meme creation apparatus may further include a communication interface, where the communication interface is used by the meme creation apparatus to communicate with another device.

DETAILED DESCRIPTION OF THE EMBODIMENTS

Figure 1:
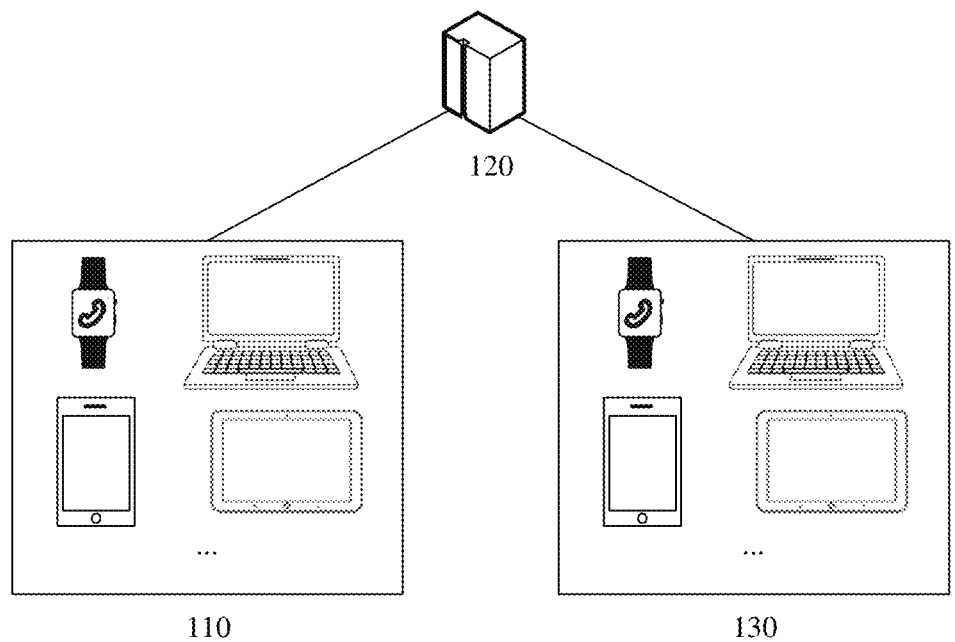
FIG. 1 is a schematic diagram of a system architecture applicable to a meme creation method according to an embodiment.

Currently, memes are mainly static or dynamic pictures, forms of the memes are undiversified, and content of the memes is monotonous. To solve the foregoing problems, a method, an apparatus, and a system for instant messaging are provided in the conventional technology. During an instant messaging session, a first client receives a speech meme transmission instruction triggered by a user; obtains a speech meme according to the speech meme transmission instruction, where the speech meme includes speech information and meme image information; and transmits the speech meme to a second client through a server, so that the second client displays, in an instant messaging session box, a meme image corresponding to the meme image information and plays a speech corresponding to the speech information, to present the speech meme.

In the conventional technology, how to transmit the speech information and the meme image information in an instant messaging system is emphasized. In addition, when the user triggers the speech meme transmission instruction, the speech information and the meme image need to be separately obtained and sent on a transmit side. A process of generating the speech meme involves a plurality of manual interventions and operations. This is not intelligent and convenient enough.

The embodiments provide a meme creation method. The method includes: An electronic device displays a first interface, where the first interface includes a speech input button; receives, in response to an operation of triggering the speech input button by a user, a speech input by the user; performs content recognition on the speech, and if the speech includes a target keyword, recommends a first image meme set to the user, where a first meme label of each image meme in the first image meme set has a matching relationship with the target keyword, in other words, the recommended meme is close to content of the speech; and obtains, in response to an operation of selecting one image meme from the first image meme set by the user, a target meme based on the image meme selected by the user and the speech; or obtains a target meme based on the image meme selected by the user and semantics corresponding to the speech, where the target meme may include image information and speech information, or the target meme may include image information and word information corresponding to the speech. This enriches forms and content of memes. In addition, the target meme can be close to the content of the speech, can meet user requirements, is easy to operate, and can improve user experience.

The meme creation method provided in the embodiments may be applied to various scenarios in which a meme can be sent, for example, a scenario in which a message is sent in instant messaging software such as a short message service or a chat application, or a scenario in which various opinions are expressed, content is shared, a comment is made, a mood (mood) is posted, or an article (for example, a blog) is posted in social software such as a blog application or a community application.

FIG. 1 is a schematic diagram of an architecture applicable to a meme creation method according to an embodiment of. The architecture includes a first electronic device 110, a server 120, and a second electronic device 130. The first electronic device 110, the server 120, and the second electronic device 130 may form a system for exchanging speech, word, and image information.

The server may be a server corresponding to an instant messaging application or a social application. The first electronic device or the second electronic device may be an electronic device, for example, a mobile phone, a tablet computer, a desktop device, a laptop device, a handheld computer, a notebook computer, an ultra-mobile personal computer (UMPC), a netbook, a cellular phone, a personal digital assistant (PDA), or an augmented reality (AR) device/a virtual reality (VR) device. A form of the electronic device is not limited in this embodiment.

For example, in a chat scenario, a user A may start a chat application on the first electronic device, input a speech, and select one image meme to obtain a target meme. The first electronic device may send the target meme to a server of the chat application, the server may send the target meme to the second electronic device, and the second electronic device displays the target meme and may output the speech carried in the target meme (after a user B performs a corresponding operation, for example, taps the target meme).

In another scenario, for example, in a scenario of posting a blog, the user A may open a blog application on the first electronic device; and the user may not only input words, but also input a speech and select one image meme to obtain a target meme. The first electronic device may send content of the blog including the words and the target meme to a server of the blog application. After the server of the blog application receives a request message that is for the content of the blog and that is sent by the second electronic device, the server may send the content of the blog including the target meme to the second electronic device. The second electronic device displays the content of the blog including the target meme and may output the speech carried in the target meme (after the user B performs a corresponding operation, for example, taps the target meme).

The following describes implementations of the embodiments in detail with reference to the accompanying drawings.

Figure 2:
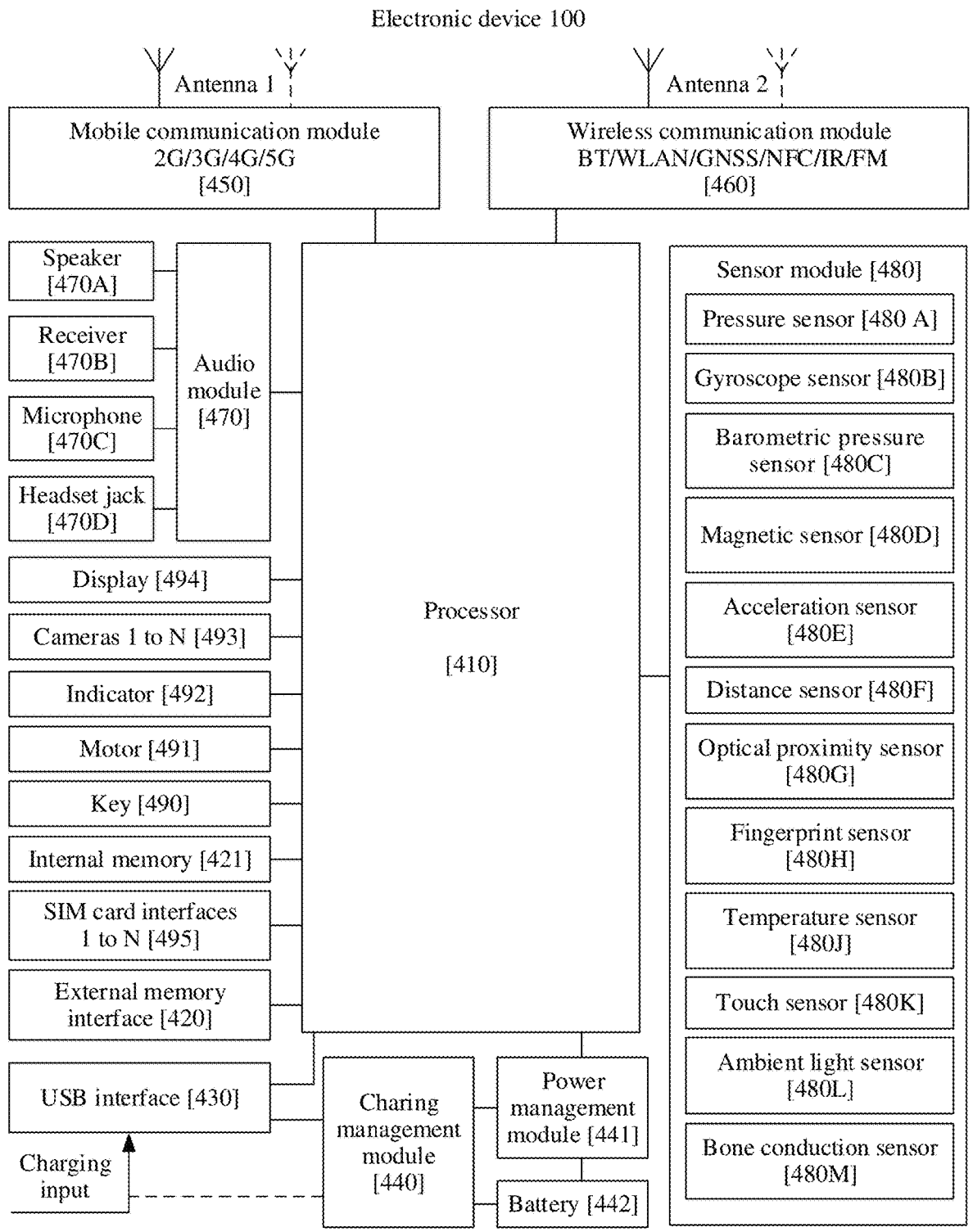
FIG. 2 is a schematic diagram of a structure of an electronic device according to an embodiment.

FIG. 2 is a schematic diagram of a structure of an electronic device 100 according to an embodiment. The electronic device 100 may be the first electronic device or the second electronic device. As shown in FIG. 2, the electronic device 100 may include a processor 410, an external memory interface 420, an internal memory 421, a universal serial bus (USB) interface 430, a charging management module 440, a power management module 441, a battery 442, an antenna 1, an antenna 2, a mobile communication module 450, a wireless communication module 460, an audio module 470, a speaker 470A, a receiver 470B, a microphone 470C, a headset jack 470D, a sensor module 480, a key 490, a motor 491, an indicator 492, cameras 493, a display 494, subscriber identity module (SIM) card interfaces 495, and the like. The sensor module 480 may include a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, a bone conduction sensor 480M, and the like.

The processor 410 may include one or more processing units. For example, the processor 410 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components or may be integrated into one or more processors.

The controller may be a nerve center and a command center of the electronic device 100. The controller may generate an operation control signal based on instruction operation code and a time sequence signal, to complete control of instruction reading and instruction execution.

A memory may be disposed in the processor 410 and is configured to store instructions and data. In some embodiments, the memory in the processor 410 is a cache. The memory may store instructions or data that has been used or cyclically used by the processor 410. If the processor 410 needs to use the instructions or the data again, the processor 410 may directly invoke the instructions or the data from the memory. This avoids repeated access, reduces waiting time of the processor 410, and improves system efficiency.

In some embodiments, the processor 410 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in this embodiment is merely used as an example for description and does not constitute a limitation on a structure of the electronic device 100. In some other embodiments, the electronic device 100 may alternatively use an interface connection manner different from that in the foregoing embodiment, or a combination of a plurality of interface connection manners.

The charging management module 440 is configured to receive charging input from a charger. The charger may be a wireless charger or a wired charger. In some wired charging embodiments, the charging management module 440 may receive charging input of the wired charger through the USB interface 430. In some wireless charging embodiments, the charging management module 440 may receive wireless charging input through a wireless charging coil of the electronic device 100. When charging the battery 442, the charging management module 440 may further supply power to the electronic device by using the power management module 441.

The power management module 441 is configured to connect the battery 442, the charging management module 440, and the processor 410. The power management module 441 receives an input from the battery 442 and/or the charging management module 440, and supplies power to the processor 410, the internal memory 421, the external memory, the display 494, the camera 493, the wireless communication module 460, and the like. The power management module 441 may be further configured to monitor parameters such as a battery capacity, a battery cycle count, and a battery health status (electric leakage or impedance). In some other embodiments, the power management module 441 may alternatively be disposed in the processor 410. In some other embodiments, the power management module 441 and the charging management module 440 may alternatively be disposed in a same device.

A wireless communication function of the electronic device 100 may be implemented through the antenna 1, the antenna 2, the mobile communication module 450, the wireless communication module 460, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be reused, to improve antenna utilization. For example, the antenna 1 may be reused as a diversity antenna in a wireless local area network. In some other embodiments, the antenna may be used in combination with a tuning switch.

The mobile communication module 450 may provide a wireless communication solution that includes 2G/3G/4G/5G or the like and that is applied to the electronic device 100. The mobile communication module 450 may include at least one filter, a switch, a power amplifier, a low noise amplifier (LNA), and the like. The mobile communication module 450 may receive an electromagnetic wave through the antenna 1, perform processing such as filtering and amplification on the received electromagnetic wave, and transmit a processed electromagnetic wave to the modem processor for demodulation. The mobile communication module 450 may further amplify a signal obtained after modulation by the modem processor and convert the signal into an electromagnetic wave through the antenna 1 for radiation. In some embodiments, at least some functional modules of the mobile communication module 450 may be disposed in the processor 410. In some embodiments, at least some functional modules of the mobile communication module 450 and at least some modules of the processor 410 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 470A, the receiver 470B, or the like), or displays an image or a video on the display 494. In some embodiments, the modem processor may be an independent component. In some other embodiments, the modem processor may be independent of the processor 410 and is disposed in a same component with the mobile communication module 450 or another functional module.

The wireless communication module 460 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 460 may be one or more components integrating at least one communication processing module. The wireless communication module 460 receives an electromagnetic wave signal through the antenna 2, performs frequency modulation and filtering processing on the electromagnetic wave signal, and sends a processed signal to the processor 410. The wireless communication module 460 may further receive a to-be-sent signal from the processor 410, perform frequency modulation and amplification on the signal, and convert the signal into an electromagnetic wave through the antenna 2 for radiation.

In some embodiments, in the electronic device 100, the antenna 1 and the mobile communication module 450 are coupled, and the antenna 2 and the wireless communication module 460 are coupled, so that the electronic device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 494, the application processor, and the like. The GPU is a microprocessor for image processing and is connected to the display 494 and the application processor. The GPU is configured to perform mathematical and geometric calculation and render an image. The processor 410 may include one or more GPUs that execute program instructions to generate or change display information.

The display 494 is configured to display an image, a video, and the like.

The display 494 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like.

The electronic device 100 can implement a photographing function by using the ISP, the camera 493, the video codec, the GPU, the display 494, the application processor, and the like.

The ISP is configured to process data fed back by the camera 493. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 493.

The camera 493 is configured to capture a still image or a video. An optical image of an object is generated through the lens, and the image is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 493, where N is a positive integer greater than 1.

The digital signal processor is configured to process a digital signal and may process another digital signal in addition to a digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 can play or record videos in a plurality of coding formats, for example, moving picture experts group (MPEG)-1, MPEG-2, MPEG-3, and MPEG-4.

The NPU is a neural-network (NN) computing processor. With reference to a structure of a biological neural network, for example, with reference to a transfer mode between neurons of a human brain, the NPU quickly processes input information, and can further continuously perform self-learning. The NPU can implement applications such as intelligent cognition of the electronic device 100, such as image recognition, facial recognition, speech recognition, and text understanding.

The external memory interface 420 may be configured to connect to an external memory card, for example, a micro SD card, to extend a storage capability of the electronic device 100. The external storage card communicates with the processor 410 through the external memory interface 420, to implement a data storage function. For example, files such as music and videos are stored in the external storage card. In this embodiment, the external storage card (for example, a micro SD card) may be used to store all pictures in a system album. The micro SD card is usually open to a user, and the user may freely delete and access the pictures in the system album.

The internal memory 421 may be configured to store computer-executable program code, where the computer-executable program code includes instructions. The processor 410 runs the instructions stored in the internal memory 421, to perform various functional applications of the electronic device 100 and data processing. For example, in this embodiment, the processor 410 may execute the instructions stored in the internal memory 421, to display corresponding display content on the display 494 in response to a second operation or a first operation of the user on the display 494. The internal memory 421 may include a program storage area and a data storage area. The program storage area may store an operating system, an application required by at least one function (for example, a sound playing function or an image playing function), and the like. The data storage area may store data (for example, audio data and an address book) and the like created when the electronic device 100 is used. In addition, the internal memory 421 may include a high-speed random access memory, and may further include a nonvolatile memory, for example, at least one magnetic disk storage device, a flash memory, a universal flash storage (UFS), and a read-only memory (ROM).

The electronic device 100 may implement audio functions, for example, music playing and recording, by using the audio module 470, the speaker 470A, the receiver 470B, the microphone 470C, the headset jack 470D, the application processor, and the like.

The audio module 470 is configured to convert digital audio information into an analog audio signal for output and is also configured to convert an analog audio input into a digital audio signal. The audio module 470 may be further configured to encode and decode an audio signal. In some embodiments, the audio module 470 may be disposed in the processor 410, or some functional modules of the audio module 470 may be disposed in the processor 410. The speaker 470A, also referred to as a "loudspeaker", is configured to convert an audio electrical signal into a sound signal. The electronic device 100 may listen to music or answer a call in a hands-free mode over the speaker 470A. The receiver 470B, also referred to as an "earpiece", is configured to convert an audio electrical signal into a sound signal. When a call is answered or audio information is listened to by using the electronic device 100, the receiver 470B may be put close to a human ear to listen to a voice. The microphone 470C, also referred to as a "mike" or a "mic", is configured to convert a sound signal into an electrical signal. At least one microphone 470C may be disposed in the electronic device 100. In some embodiments, two microphones 470C may be disposed in the electronic device 100, to collect a sound signal and implement a noise reduction function. In some embodiments, three, four, or more microphones 470C may alternatively be disposed in the electronic device 100, to collect a sound signal, implement noise reduction, and identify a sound source, so as to implement a directional recording function and the like.

In this embodiment, when the user needs to send a voice, the user may make a sound near the microphone 470C through the mouth and input a sound signal to the microphone 470C. Then, the audio module 470 may be configured to convert an analog audio input obtained by the microphone 470C into a digital audio signal and encode and decode the audio signal.

The headset jack 470D is configured to connect to a wired headset. The headset jack 470D may be the USB interface 430 or may be a 3.5 mm open mobile terminal platform (OMTP) standard interface, or a cellular telecommunication industry association of the USA (CTIA) standard interface.

The pressure sensor 480A is configured to sense a pressure signal and can convert the pressure signal into an electrical signal. In some embodiments, the pressure sensor 480A may be disposed on the display 494. There is a plurality of types of pressure sensors 480A, such as a resistive pressure sensor, an inductive pressure sensor, and a capacitive pressure sensor. The capacitive pressure sensor may include at least two parallel plates made of conductive materials. When force is applied to the pressure sensor 480A, capacitance between electrodes changes. The electronic device 100 determines pressure strength based on a change of the capacitance. When a touch operation is performed on the display 494, the electronic device 100 detects intensity of the touch operation by using the pressure sensor 480A. The electronic device 100 may calculate a touch position based on a detection signal of the pressure sensor 480A. In some embodiments, touch operations that are performed at a same touch position but have different touch operation strength may correspond to different operation instructions. For example, when a touch operation with touch operation strength less than a first pressure threshold is performed on a Messages icon, an instruction for viewing an SMS message is executed. When a touch operation with touch operation strength greater than or equal to the first pressure threshold is performed on the Messages icon, an instruction for creating an SMS message is executed.

The gyroscope sensor 480B may be configured to determine a motion posture of the electronic device 100. In some embodiments, an angular velocity of the electronic device 100 about three axes (namely, x, y, and z axes) may be determined by using the gyroscope sensor 480B. The gyroscope sensor 480B may be configured for stabilization during photographing. For example, when the shutter is pressed, the gyroscope sensor 480B detects an angle at which the electronic device 100 jitters, obtains, through calculation based on the angle, a distance for which a lens module needs to compensate, and allows the lens to cancel a jitter of the electronic device 100 through reverse motion, to implement image stabilization. The gyroscope sensor 480B may be further used in a navigation scenario and a motion-sensing game scenario. In this embodiment, the display 494 of the electronic device 100 may be folded to be a plurality of screens. Each screen may include the gyroscope sensor 480B, configured to measure an orientation (namely, a direction vector of the orientation) of a corresponding screen. The electronic device 100 may determine an included angle between adjacent screens based on an angular change of an orientation of each screen that is obtained through measurement.

The barometric pressure sensor 480C is configured to measure barometric pressure. In some embodiments, the electronic device 100 calculates an altitude based on a barometric pressure value measured by the barometric pressure sensor 480C, to assist in positioning and navigation.

The magnetic sensor 480D includes a Hall sensor. The electronic device 100 may detect opening and closing of a flip cover by using the magnetic sensor 480D. In some embodiments, when the electronic device 100 is a clamshell phone, the electronic device 100 may detect opening and closing of the flip cover by using the magnetic sensor 480D. Further, a feature such as automatic unlocking upon opening of the flip cover is set based on a detected opening or closing state of the flip cover.

The acceleration sensor 480E may detect values of accelerations in various directions (usually on three axes) of the electronic device 100. When the electronic device 100 is still, a magnitude and a direction of gravity may be detected. The acceleration sensor 180E may be further configured to identify a posture of the electronic device and is used in applications such as switching between landscape mode and portrait mode and a pedometer. It should be noted that, in this embodiment, the display 494 of the electronic device 100 may be folded to be a plurality of screens. Each screen may include the acceleration sensor 480E, configured to measure an orientation (namely, a direction vector of the orientation) of a corresponding screen.

The distance sensor 480F is configured to measure a distance. The electronic device 100 may measure a distance in an infrared or a laser manner. In some embodiments, in a photographing scenario, the electronic device 100 may measure a distance by using the distance sensor 480F, to implement quick focusing.

The optical proximity sensor 480G may include, for example, a light-emitting diode (LED) and a light detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 480G, that the user holds the electronic device 100 close to an ear for a call, to automatically turn off a screen for power saving. The optical proximity sensor 480G may also be used in a leather case mode or a pocket mode to automatically unlock or lock the screen.

The ambient light sensor 480L is configured to sense ambient light brightness. The electronic device 100 may adaptively adjust brightness of the display 494 based on the sensed ambient light brightness. The ambient light sensor 480L may also be configured to automatically adjust a white balance during photographing. The ambient light sensor 480L may further cooperate with the optical proximity sensor 480G to detect whether the electronic device 100 is in a pocket, to prevent an accidental touch.

The fingerprint sensor 480H is configured to capture a fingerprint. The electronic device 100 may use a feature of the collected fingerprint to implement fingerprint-based unlocking, application lock access, fingerprint-based photographing, fingerprint-based call answering, and the like.

The temperature sensor 480J is configured to detect a temperature. In some embodiments, the electronic device 100 executes a temperature processing policy based on a temperature detected by the temperature sensor 480J. For example, when the temperature reported by the temperature sensor 480J exceeds a threshold, the electronic device 100 lowers performance of a processor located near the temperature sensor 480J, to reduce power consumption to implement thermal protection. In some other embodiments, when the temperature is less than another threshold, the electronic device 100 heats the battery 442 to prevent the electronic device 100 from being shut down abnormally due to a low temperature. In some other embodiments, when the temperature is less than still another threshold, the electronic device 100 boosts an output voltage of the battery 442, to avoid abnormal shutdown due to a low temperature.

The touch sensor 480K is also referred to as a "touch panel". The touch sensor 480K may be disposed on the display 494. The touch sensor 480K and the display 494 form a touchscreen, which is also referred to as a "touch screen". The touch sensor 480K is configured to detect a touch operation performed on or near the touch sensor. The touch sensor may transfer the detected touch operation to the application processor, to determine a type of a touch event. A visual output related to the touch operation may be provided on the display 494. In some other embodiments, the touch sensor 480K may alternatively be disposed on a surface of the electronic device 100 at a position different from a position of the display 494.

In this embodiment, a process of creating, transferring, receiving, and customizing a target meme may be completed by performing a corresponding operation on the touchscreen.

The bone conduction sensor 480M may obtain a vibration signal. In some embodiments, the bone conduction sensor 480M may obtain a vibration signal of a vibration bone of a human vocal-cord part. The bone conduction sensor 480M may also be in contact with a human pulse and receive a blood pressure beating signal. In some embodiments, the bone conduction sensor 480M may also be disposed in the headset, to obtain a bone conduction headset. The audio module 470 may obtain a speech signal through parsing based on the vibration signal that is of the vibration bone of the vocal-cord part and that is obtained by the bone conduction sensor 480M, to implement a speech function. The application processor may parse heart rate information based on the blood pressure beating signal obtained by the bone conduction sensor 480M, to implement a heart rate detection function.

The key 490 includes a power-on key, a volume key, and the like. The key 490 may be a mechanical key and may be a touch key. The electronic device 100 may receive a key input and generate a key signal input related to a user setting and functional control of the electronic device 100.

The motor 491 may generate a vibration prompt. The motor 491 may be used for an incoming call vibration prompt or may be used for touch vibration feedback. For example, touch operations performed on different applications (for example, photographing and audio playing) may correspond to different vibration feedback effects. The motor 491 may also correspond to different vibration feedback effects for touch operations performed on different areas of the display 494. Different application scenarios (for example, a time reminder, information receiving, an alarm clock, and a game) may also correspond to different vibration feedback effects. A touch vibration feedback effect may alternatively be customized.

The indicator 492 may be an indicator light and may be used to indicate a charging status or a power change; or may be used to indicate a message, a missed call, a notification, or the like.

The SIM card interface 495 is configured to connect a SIM card. The SIM card may be inserted into the SIM card interface 495 or removed from the SIM card interface 495, to implement contact with or separation from the electronic device 100. The electronic device 100 may support one or N SIM card interfaces, where N is a positive integer greater than 1. The SIM card interface 495 can support a nano-SIM card, a micro-SIM card, a SIM card, and the like. A plurality of cards may be simultaneously inserted into a same SIM card interface 495. The plurality of cards may be of a same type or may be of different types. The SIM card interface 495 is applicable to different types of SIM cards. The SIM card interface 495 may also be compatible with the external storage card. The electronic device 100 interacts with a network by using the SIM card, to implement functions such as calling and data communication. In some embodiments, the electronic device 100 uses an eSIM, namely, an embedded SIM card. The eSIM card may be embedded into the electronic device 100 and cannot be separated from the electronic device 100.

All methods in the following embodiments may be implemented on the electronic device 100 having the foregoing hardware structure.

It may be understood that the structure shown in this embodiment does not constitute a limitation on the electronic device 100. In some other embodiments, the electronic device 100 may include more or fewer components than those shown in the figure, or some components may be combined, or some components may be split, or different component arrangements may be used. The components shown in the figure may be implemented through hardware, software, or a combination of software and hardware. For example, the electronic device 100 may further include auxiliary devices such as a mouse, a keyboard, or a drawing board, configured to perform the process of creating, transmitting, receiving, and customizing the target meme.

Figure 3:
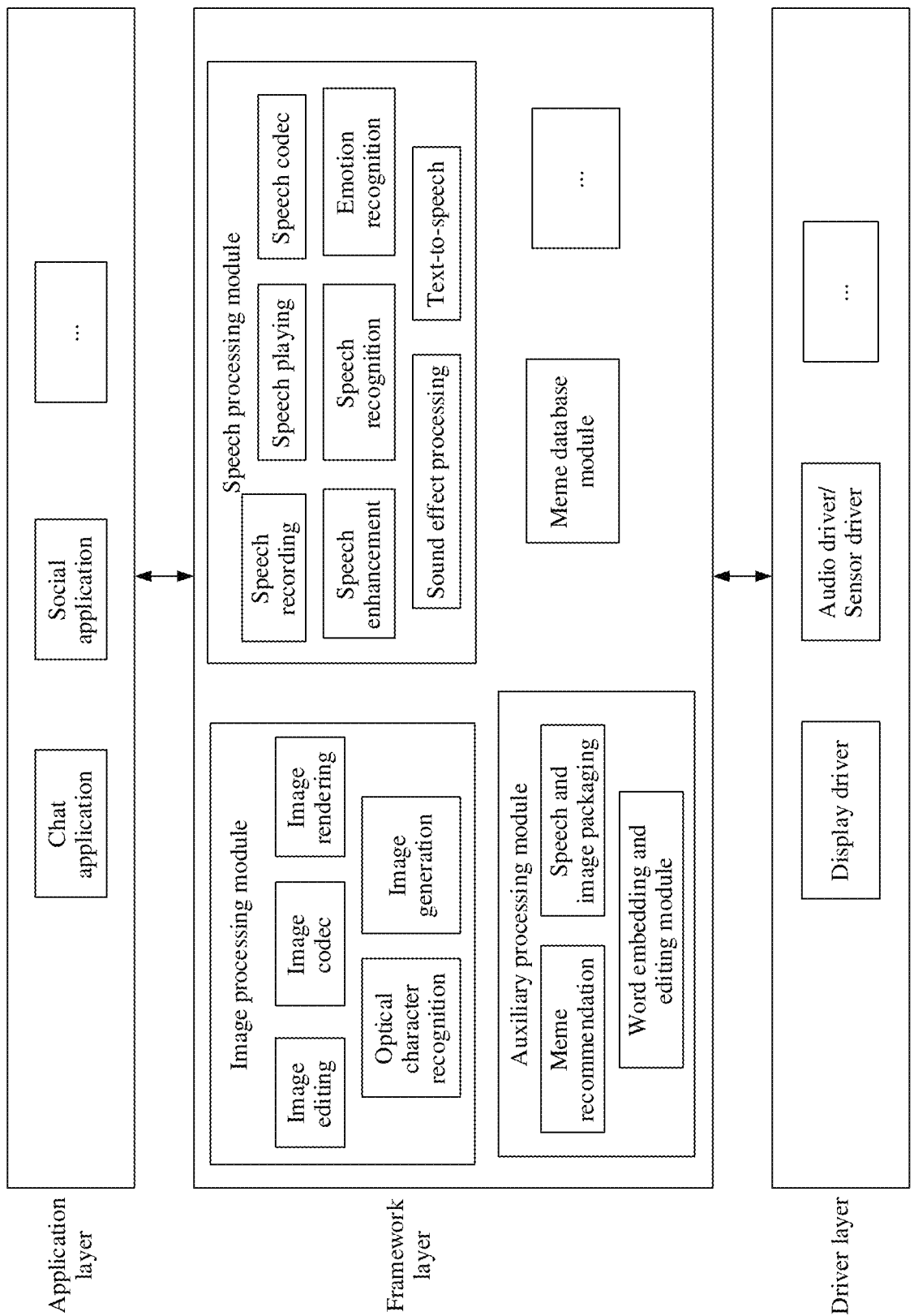
FIG. 3 is a schematic diagram of a software structure of an electronic device according to an embodiment.

FIG. 3 is a block diagram of a software structure of the electronic device 100 according to an embodiment. A software system of the electronic device 100 may use a layered architecture, an event-driven architecture, a microkernel architecture, a micro service architecture, or a cloud architecture. In this embodiment, an Android system of a layered architecture is used as an example to describe the software structure of the electronic device 100.

In a layered architecture, software may be divided into several layers, and each of the layers has a clear role and task. The layers communicate with each other through software interfaces. In some embodiments, the Android system is divided into three layers: an application program layer (application layer), an application framework layer (framework layer), and a kernel layer (also referred to as a driver layer) from top to bottom.

The application layer may include a series of application packages. As shown in FIG. 3, the application layer may include a plurality of application packages such as a chat application and a social application. The application layer may include applications such as Camera, Gallery, Calendar, Phone, Maps, Navigation, WLAN, Bluetooth, Music, Videos, Messages, and Desktop Launcher (not shown in FIG. 3).

The framework layer provides an application programming interface (API) and a programming framework for application programs at the application layer. The application framework layer includes some predefined functions. As shown in FIG. 3, the framework layer may include an image processing module, a speech processing module, an auxiliary processing module, and a meme database module. Optionally, the framework layer may further include a content provider, a view system, a phone manager, a resource manager, a notification manager, and the like (not shown in FIG. 3).

The speech processing module is configured to process speech information of a user. The speech processing module may include a speech recording module, a speech playing module, a speech codec module, a speech enhancement module, a speech recognition module, an emotion recognition module, a sound effect processing module, a text-to-speech module, and the like. The speech recording module is configured to record a speech input by the user. The speech playing module is configured to play the speech. The speech codec module is configured to encode or decode the speech input by the user. The speech enhancement module is configured to perform denoising, dereverberation, deechoing processing, and the like on the speech that carries noise and is input by the user. The speech recognition module may convert, by using a speech recognition (ASR) algorithm, the speech input by the user into text information. The emotion recognition module may extract, by using a speech emotion recognition (SER) algorithm, an emotional color when the user speaks. The sound effect processing module adds sound effect features such as a dialect feature, an emotional feature, an animation figure voice feature, and a celebrity voice feature to the speech input by the user. The text-to-speech module may convert, by using a text-to-speech (TTS) algorithm, word information in a meme into audio information.

The image processing module is configured to process image information input by the user. The image processing module may include an image editing module, an image codec module, an image rendering module, an optical character recognition (OCR) module, an image generation module, and the like. The image editing module may provide a manual drawing function for the user. The image codec module is configured to encode or decode an image drawn by the user. The image rendering module is configured to render the image drawn by the user. The optical character recognition module may extract words in the image from the image. The image generation module may enrich, in a deep learning manner, the image drawn by the user, to generate a corresponding meme image.

The meme database module is configured to store an image meme data set.

The auxiliary processing module includes a meme recommendation module, a word embedding and editing module, a speech and image packaging module, and the like. The meme recommendation module is configured to obtain, based on speech text information and speech emotion information that are input by the user, a corresponding meme from the meme database module in a keyword matching manner, to recommend the meme to the user for use. The word embedding and editing module may embed words (words obtained through speech recognition) into a meme image and may provide the user with a function of editing a word format. The speech and image packaging module is configured to package a speech and an image into a complete speech meme file, and the file may be stored in a format of a video file.

The kernel layer is a layer between hardware and software. The kernel layer includes at least a display driver, a camera driver, an audio driver, and a sensor driver.

The following describes a software workflow of the electronic device 100 by using a scenario in which a speech meme is sent in a chat application as an example.

After starting the chat application, the user may input a speech. The kernel layer may generate a corresponding input event (for example, a speech input event) based on an input operation of the user and report the event to the application program framework layer. The application program framework layer may perform, by using the speech processing module, corresponding processing on the speech input by the user. Then, the auxiliary processing module at the application framework layer may determine, by using the meme recommendation module, one or more image memes that match the speech input by the user and display the one or more image memes in a display interface by using the display driver. After receiving an operation of selecting one meme by the user, the kernel layer may report a meme selection event to the application framework layer. The auxiliary processing module at the application framework layer may package the speech and an image into a complete speech meme file by using the speech and image packaging module, and then send the complete speech meme file to a peer end by using a communication module (for example, a routing module) of the electronic device.

The following describes solutions in the embodiments with reference to the accompanying drawings. In the descriptions, unless otherwise specified, "at least one" means one or more, and "a plurality of" means two or more. In addition, to clearly describe the solutions in the embodiments, words such as "first" and "second" are used in the embodiments to distinguish between same items or similar items that have basically the same functions or purposes. A person skilled in the art may understand that the words such as "first" and "second" do not limit a quantity and an execution sequence, and the words such as "first" and "second" do not indicate a definite difference either.

For ease of understanding, the following describes the meme creation method provided in the embodiments with reference to the accompanying drawings.

Figure 4:
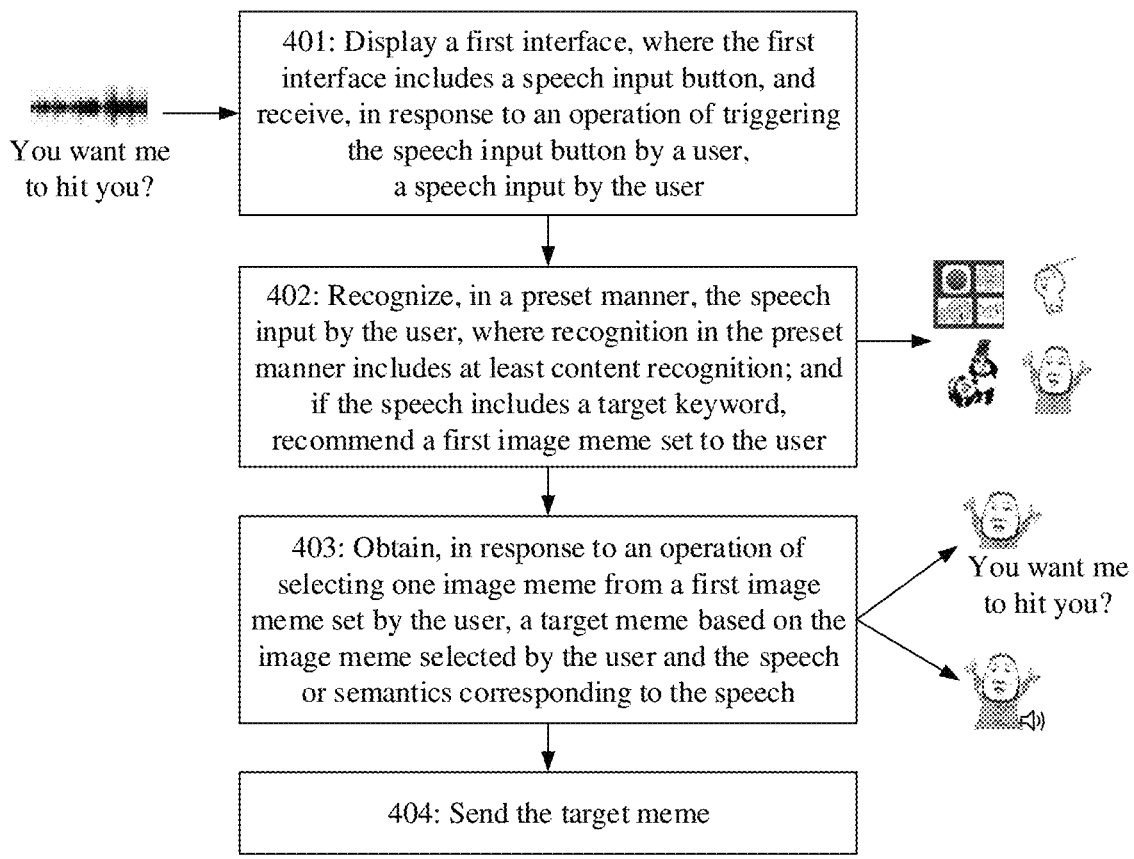
FIG. 4 is a schematic flowchart applicable to a meme creation method according to an embodiment.

As shown in FIG. 4, an embodiment provides a meme creation method. An example in which an electronic device is a mobile phone and an application scenario is a chat scenario is used for description. The method includes the following steps.

401: Display a first interface, where the first interface includes a speech input button, and receive, in response to an operation of triggering the speech input button by a user, a speech input by the user.

The first interface may be a dialog interface with a target contact. Alternatively, the first interface may be a content sharing interface, for example, a mood posting interface; or the first interface may be a comment interface, for example, a blog comment interface, a forum comment interface, or a Moments comment interface.

Figure 5A:
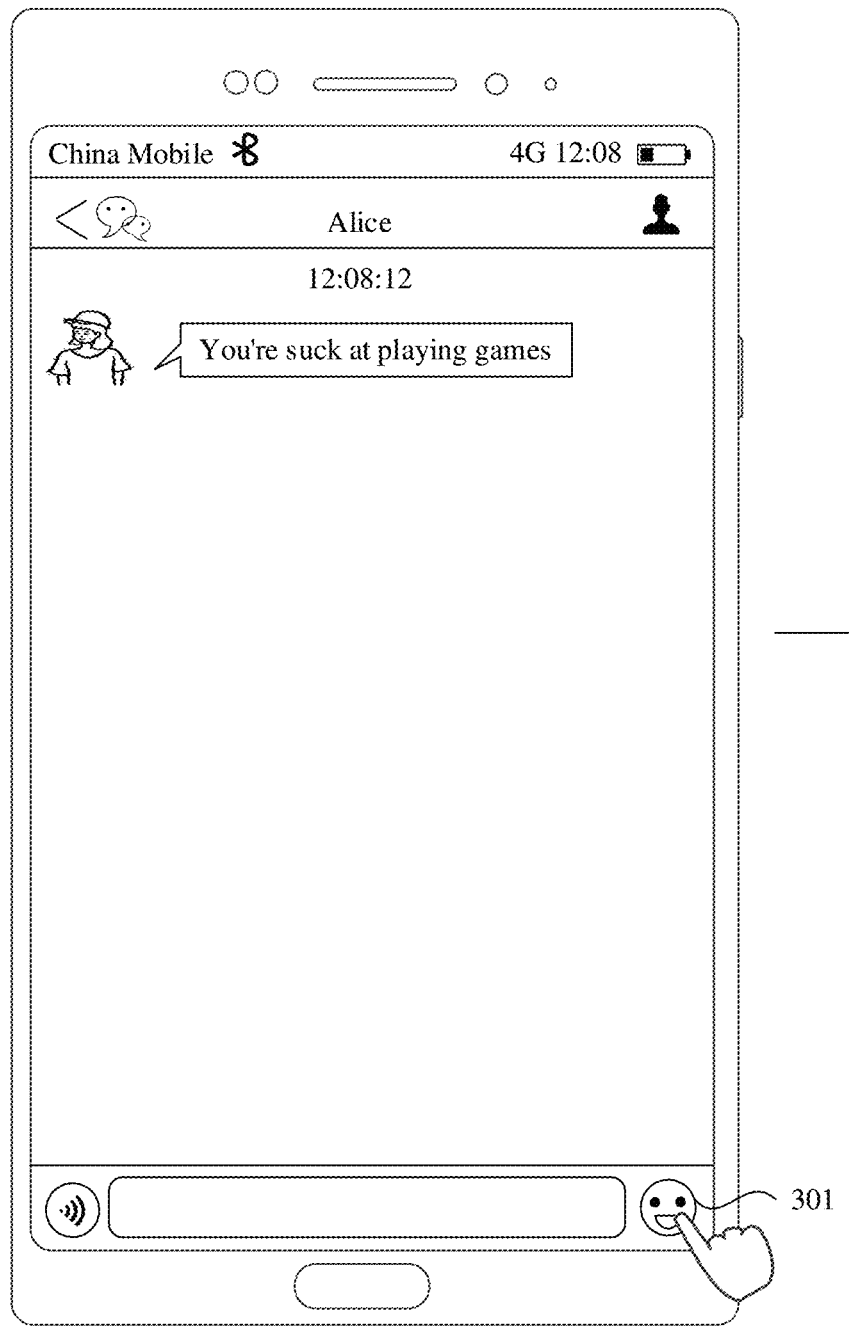
FIG. 5(a) to FIG. 5(c) are schematic display diagrams of a mobile phone according to an embodiment.
Figure 5B:
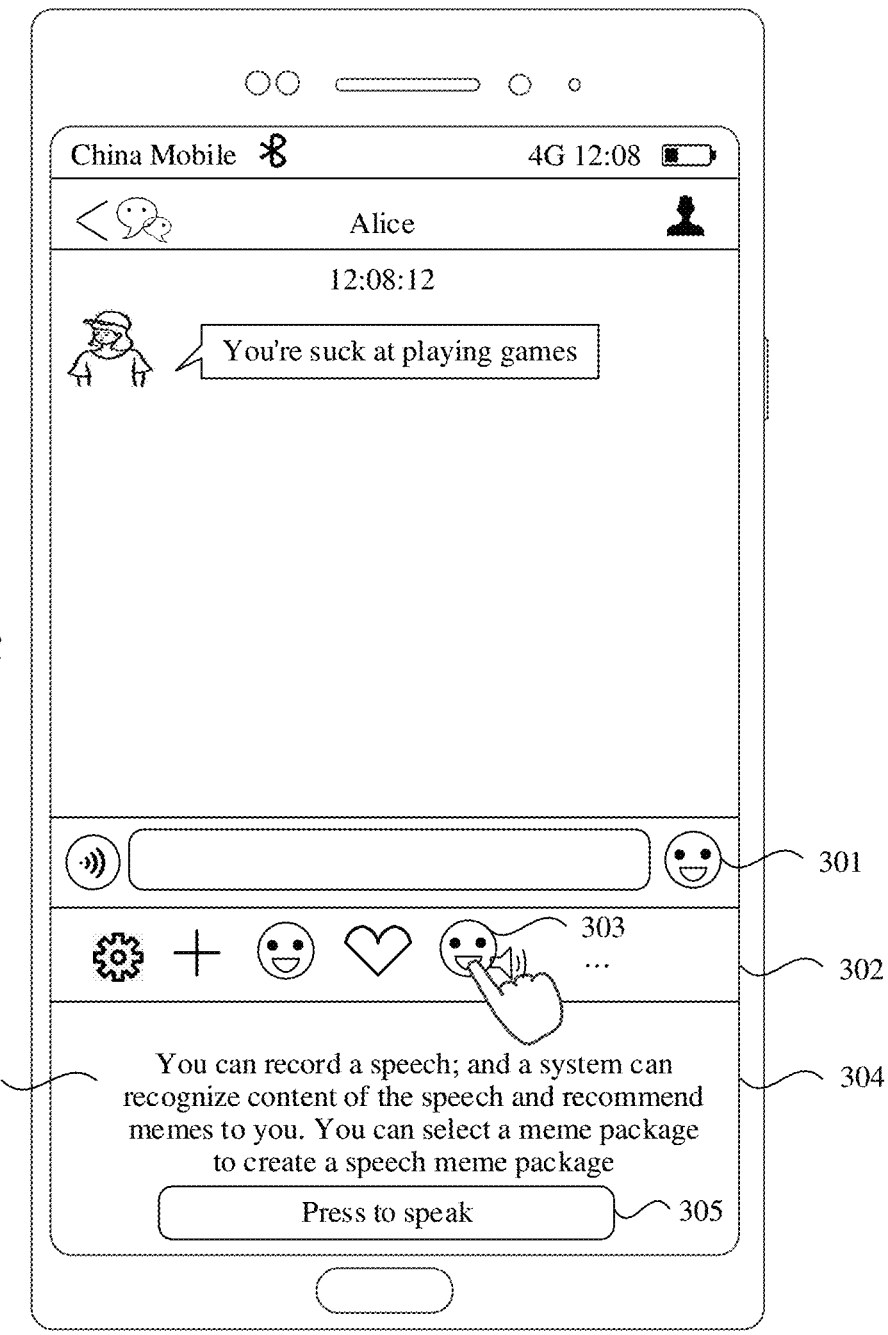

A chat application is used as an example. For example, the mobile phone may display a dialog interface between the user (for example, Tom) and a contact Alice. In some embodiments, when the user wants to send a speech meme, as shown in FIG. 5(a), the user may trigger a meme button 301. In response to an operation of triggering the meme button 301 by the user, as shown in FIG. 5(b), the mobile phone displays a meme menu 302. The meme menu 302 may include a speech meme creation button 303. The user may trigger the speech meme creation button 303. In response to an operation of triggering the speech meme creation button 303 by the user, the mobile phone may display a speech meme creation window 304. The speech meme creation window 304 includes a speech input button (a speech recording button) 305, and prompt information "press to speak" may be displayed on the speech input button 305. The speech meme creation window 304 may further include prompt information 306, where the prompt information 306 prompts the user how to create a speech meme. The user may press the speech input button 305 to speak (input a speech). For example, the speech input by the user may be "you want me to hit you?". After the mobile phone detects an operation of pressing the speech input button 305 by the user, the mobile phone may invoke a microphone to pick up a corresponding audio signal. After the mobile phone detects that the user finishes speaking, for example, after the mobile phone detects that the user releases the speech input button 305 or detects that the user does not speak within a preset time interval, the mobile phone considers that the user finishes speaking.

Figure 5C:
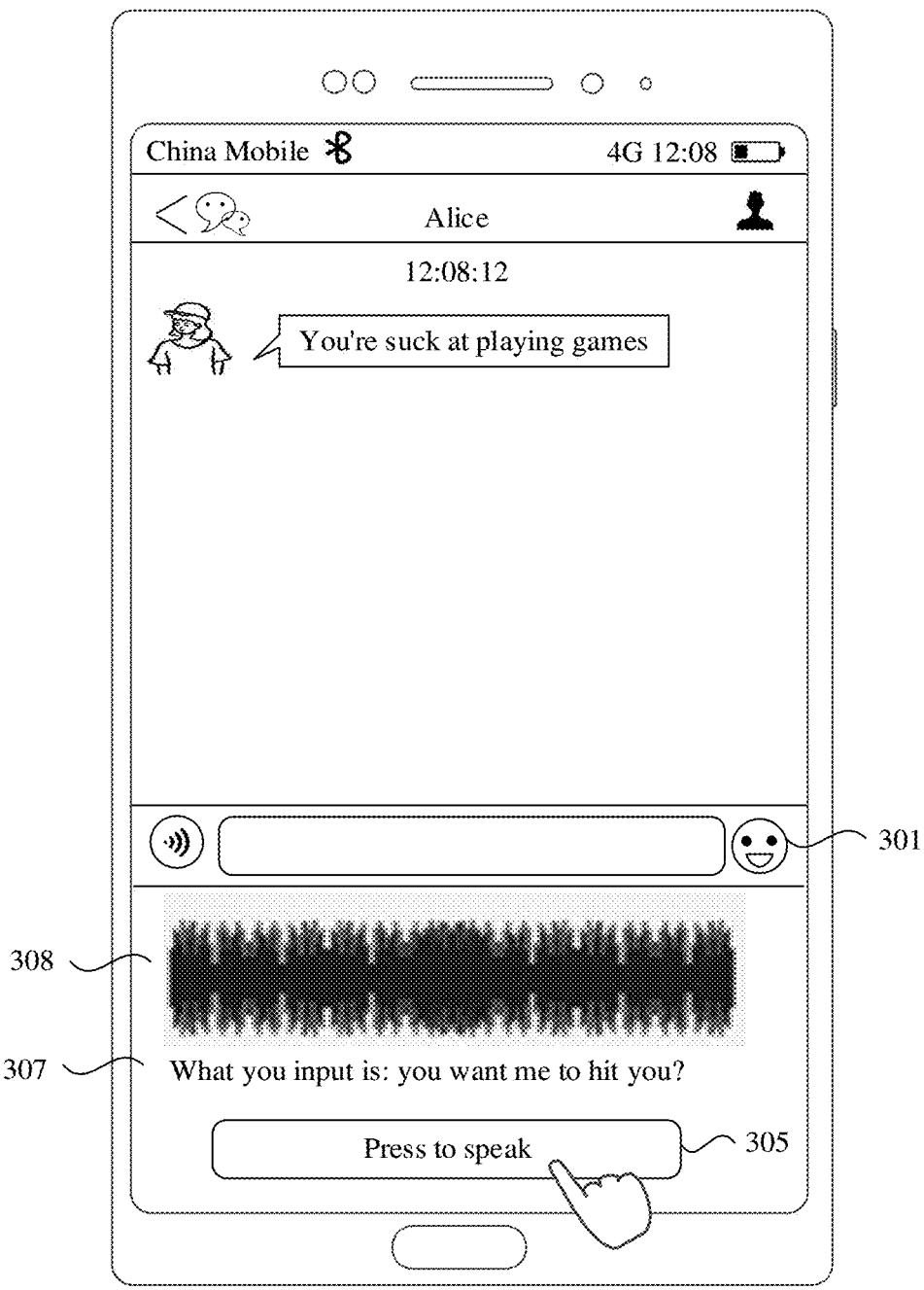

After the mobile phone detects the operation of pressing the speech input button 305 by the user, the mobile phone may convert, by using an automatic speech recognition algorithm, the speech input by the user into corresponding text, translate the text into corresponding words, and display the words 307 corresponding to the speech in a display interface. As shown in FIG. 5(c), the words 307 corresponding to the speech input by the user may be "you want me to hit you?". Optionally, the mobile phone may further display a frequency 308 of the speech input by the user in the display interface. Further, the mobile phone may further perform speech enhancement processing, for example, denoising, dereverberation, deechoing processing, on the speech that carries noise and that is input by the user, to obtain a clean speech. For a process, refer to the conventional technology. Details are not described.

Figure 6A:
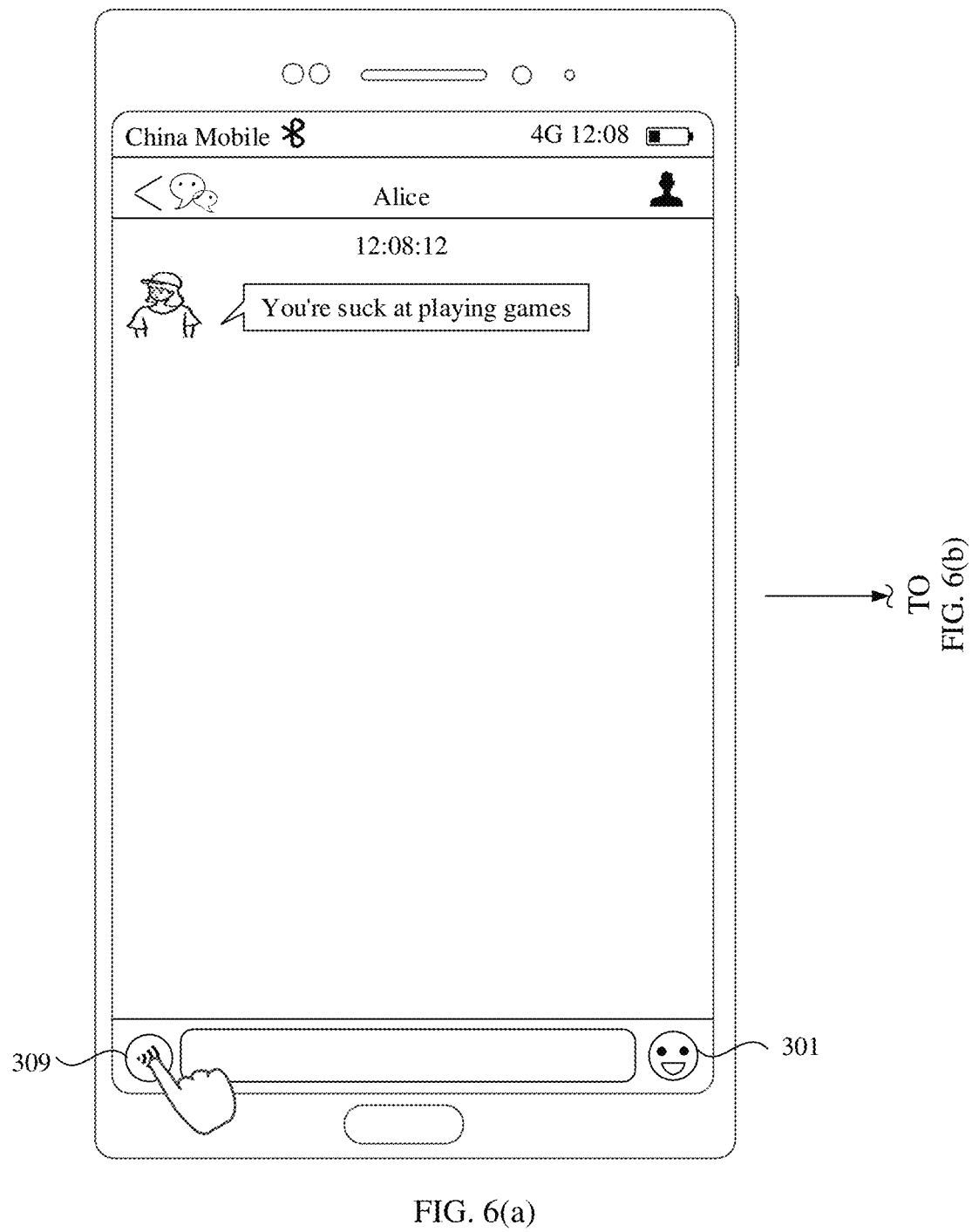
FIG. 6(a) to FIG. 6(c) are schematic display diagrams of a mobile phone according to an embodiment.
Figure 6B:
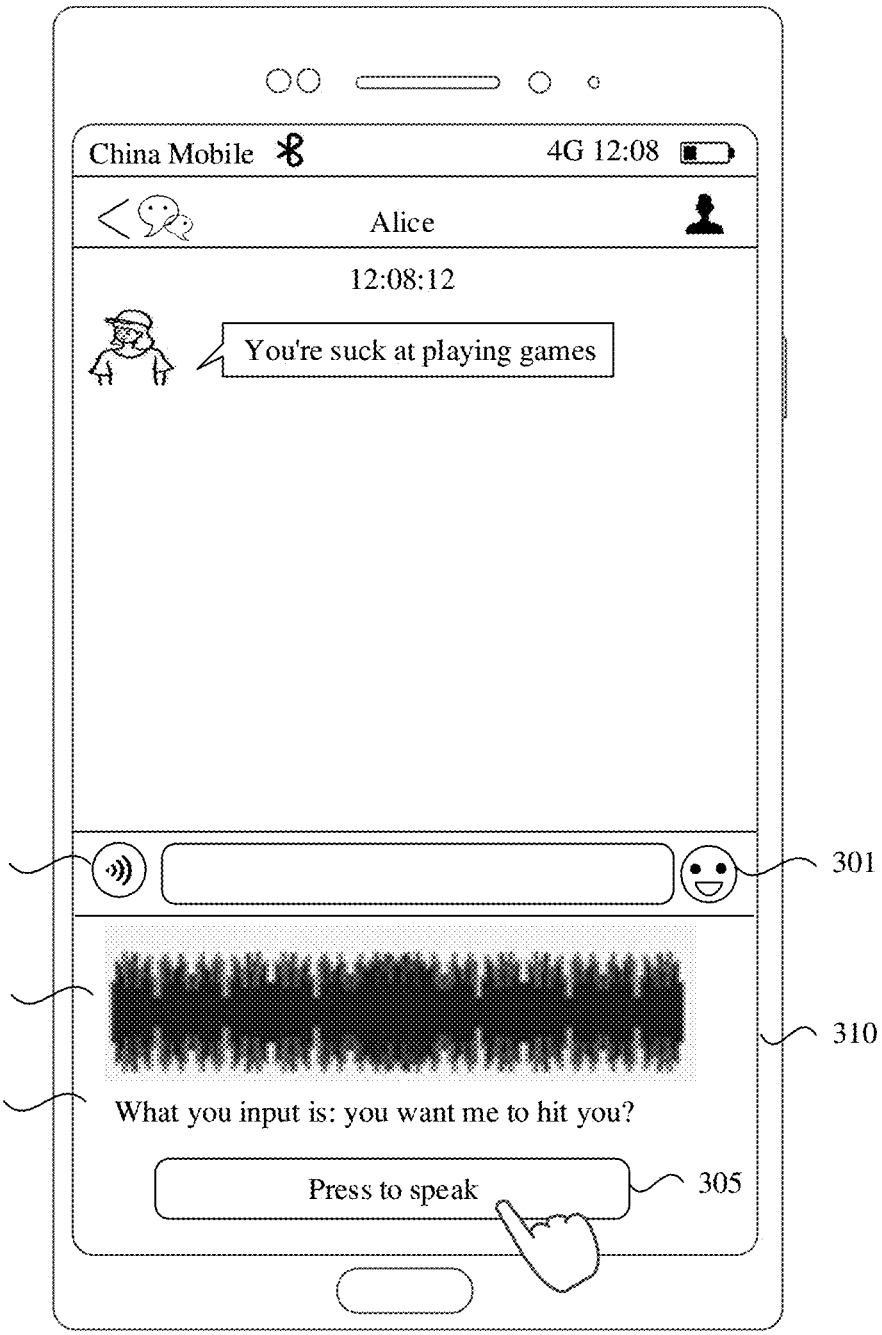

In some embodiments, when the user wants to send a speech meme, as shown in FIG. 6(a), the user may trigger a speech button 309. After the mobile phone detects an operation of triggering the speech button 309 by the user, as shown in FIG. 6(b), the mobile phone may display a speech input window 310. The speech input window 310 may include a speech input button (a speech recording button) 305, and prompt information "press to speak" may be displayed on the speech input button 305. The user may press the speech input button 305 to speak (input a speech). After the mobile phone detects an operation of pressing the speech input button 305 by the user, the mobile phone may invoke the microphone to pick up a corresponding audio signal. After the mobile phone detects that the user finishes speaking, for example, after the mobile phone detects that the user releases the speech input button 305 or detects that the user does not speak within a preset time interval, the mobile phone considers that the user finishes speaking.

After detecting that the user finishes speaking, the mobile phone may display first prompt information, where the first prompt information prompts the user whether an image meme needs to be recommended based on the speech. If the mobile phone receives an operation of recommending the image meme based on the speech that is triggered by the user, the mobile phone may perform step 402.

Figure 6C:
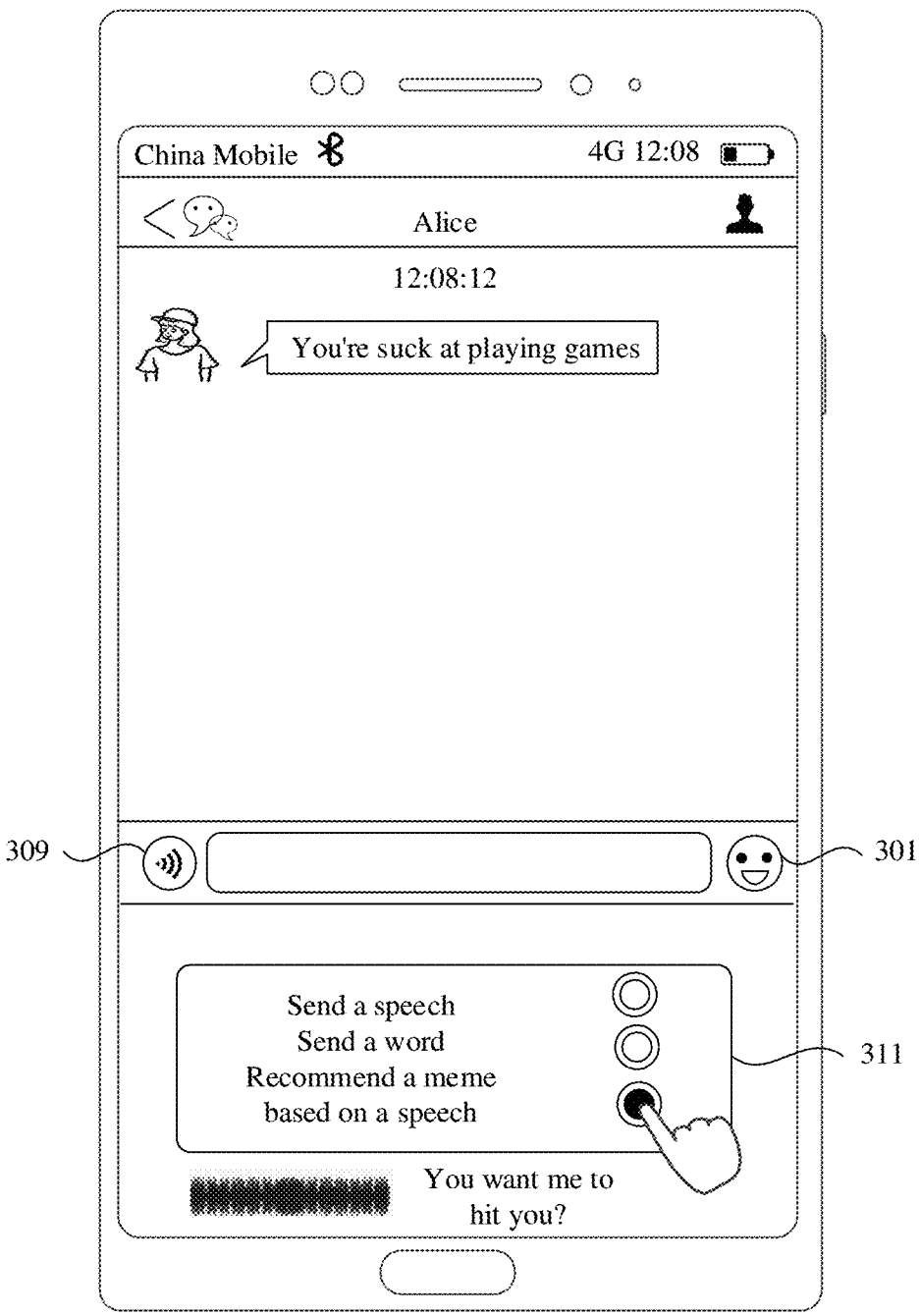

For example, as shown in FIG. 6(c), the mobile phone may pop up a pop-up box 311. The pop-up box 311 includes options such as sending a speech, sending a word, and recommending a meme based on a speech. In response to an operation of selecting the option of recommending a meme based on a speech by the user, the mobile phone may perform step 402.

402: Recognize, in a preset manner, the speech input by the user, where recognition in the preset manner includes at least content recognition; and if the speech includes a target keyword, recommend a first image meme set to the user.

A first meme label of each image meme in the first image meme set has a matching relationship with the target keyword.

It should be noted that the mobile phone may prestore an image meme data set in a local image meme database, where the image meme data set includes a plurality of image memes and a meme label corresponding to each image meme. Each image meme may include a plurality of meme labels, for example, a first meme label, a second meme label, and a third meme label. The first meme label identifies key characteristic information of an image meme, and the key characteristic information describes a subject or subject content of the image meme. It may be considered that the first meme label is a meme label with a highest priority among the plurality of meme labels. The first meme label may be, for example, "hit", "haha", or "emo".

For image memes whose key characteristic information is the same or similar, first meme labels of the image memes are the same. For example, as shown in Table 1, image memes with a same first meme label may form a meme set, and the first meme set may be a meme set 1, a meme set 2, or the like.

TABLE 1

| | Meme | First meme label |
|---|---|---|
| Meme set 1 | Meme 1 | Hit |
| | Meme 2 | |
| | ... | |
| Meme set 2 | Meme n | Haha |
| | Meme n + 1 | |
| | ... | |
| ... | | ... |

The mobile phone may perform, by using a speech recognition module, content recognition on the speech input by the user, to determine whether the speech includes the target keyword. The target keyword may be, for example, "hit", "haha", or "emo". For example, if the speech input by the user is "you really want me to hit you!", the mobile phone may recognize a keyword "hit". If the speech input by the user is "catch the car in the last minute, haha", the mobile phone may recognize a keyword "haha". If the mobile phone recognizes that the speech includes the target keyword, the mobile phone recommends the first image meme set to the user. The first meme label of each image meme in the first image meme set has the matching relationship with the target keyword. For example, if the target keyword is "hit", the first meme set is a meme set whose first meme label is "hit". For example, the first meme set may be the meme set 1 in Table 1.

Alternatively, the mobile phone may send the speech input by the user to a server, and the server pre-stores the foregoing image meme data set. The server may perform content recognition on the speech input by the user. If the server determines that the speech includes the target keyword, the server may send the first image meme set to the mobile phone. The mobile phone receives the first image meme set sent by the server and recommends the first image meme set to the user, in other words, displays the first image meme set in the display interface.

Figure 7A:
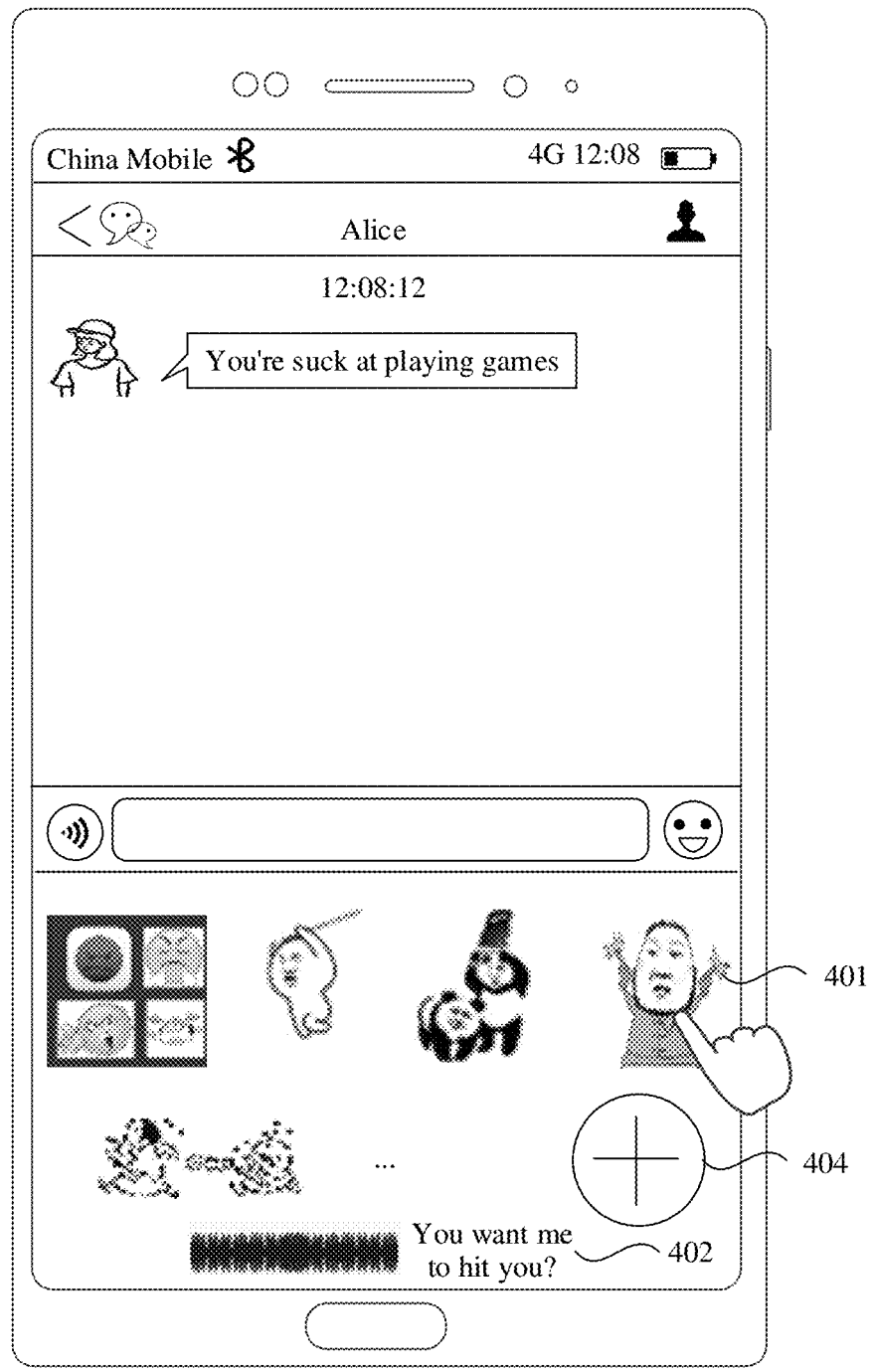
FIG. 7a is still another schematic display diagram of a mobile phone according to an embodiment.

For example, as shown in FIG. 7a, if the speech input by the user is "you want me to hit you?", it may be determined that the speech includes the target keyword "hit". The mobile phone may display image memes in the first meme set whose first meme label is "hit" in the display interface for the user to select. Optionally, when displaying recommended at least one image meme, the mobile phone may further display, in the display interface, a frequency and words 402 that correspond to the speech input by the user, to prevent the user from forgetting content of the previously input speech when selecting the image meme, and prompt the user to select an image meme that is closer to the words of the speech. In this way, the speech meme created by the user is more vivid.

In addition, if it is determined that the speech input by the user does not include a target keyword matching a first meme label of any image meme in the meme data set, an image meme may not be recommended, and the user may be prompted to re-input a speech.

In some embodiments, the recognition in the preset manner further includes emotion recognition, which may be further performed on the speech input by the user. If the speech belongs to a target emotional color (emotional tone/ emotional direction), a second meme label of each image meme in the first image meme set has a matching relationship with the target emotional color. The second meme label identifies an emotional color of the image meme. It may be considered that the second meme label is a meme label with a second highest priority among the plurality of meme labels. The second meme label may be, for example, "happy", "angry", or "sad". For example, as shown in Table 2, each meme set (a set with a same first meme label) may include one or more meme subsets, and second meme labels of all image memes in a meme subset are the same. The first meme set may be a meme subset 1, a meme subset 2, or the like of the meme set 1.

TABLE 2

| | Meme | | Second meme label |
|---|---|---|---|
| Meme set 1 | Meme subset 1 | Meme 1 | Happy |
| | | Meme 2 | |
| | Meme subset 2 | Meme 3 | Angry |
| | | Meme 4 | |
| | | ... | |
| | ... | | ... |

For example, if the mobile phone determines that the speech input by the user has a high pitch and a high frequency, it may be considered that the emotional color of the user is "angry". The mobile phone may determine, from the first emotion set, meme subsets whose second meme label is the emotional color "angry" and display the meme subsets in the display interface for the user to select. In this way, a meme can be recommended to the user more accurately, and user experience can be improved.

In addition, if the speech input by the user does not have an obvious emotional color, for example, a tone is very smooth and does not obviously fluctuate, a meme set may be directly recommended to the user based on only the target keyword.

Image memes recommended by the mobile phone to the user may include emojis and stickers. The sticker may include a static meme image and may further include a dynamic meme image (for example, a GIF animation). Further, the image memes recommended by the mobile phone to the user may alternatively be local or downloaded static pictures or dynamic pictures. This is not limited.

In some other embodiments, the mobile phone may first perform emotion recognition on the speech input by the user, and match recognized emotional colors with second meme labels of the image memes, to determine a second image meme set. A second meme label of each image meme in the second image meme set matches the emotional color of the speech input by the user. In this case, it may be considered that the second meme label is a meme label with a highest priority among the plurality of meme labels of the image meme. Then, the second image meme set may be recommended to the user.

Further, keyword recognition may be further performed on the speech input by the user, and whether the speech includes the target keyword is determined, to determine, from the second image meme set, an image meme subset matching the target keyword. A first meme label of each image meme in the meme subset matches the target keyword. In this case, it may be considered that the first meme label is a meme label with a second highest priority among the plurality of meme labels of the image meme. Then, the second image meme set may be recommended to the user.

403: Obtain, in response to an operation of selecting one image meme from the first image meme set by the user, a target meme based on the image meme selected by the user and the speech or semantics corresponding to the speech.

In some embodiments, second prompt information may be displayed in response to the operation of selecting one image meme from the first image meme set by the user, where the second prompt information prompts the user whether to create a speech meme or a word meme. In some embodiments, if the first image meme set includes only one image meme, in other words, the mobile phone recommends only one image meme to the user, the mobile phone may directly prompt the user whether to use the image meme to create a speech meme or a word meme.

Figure 7B:
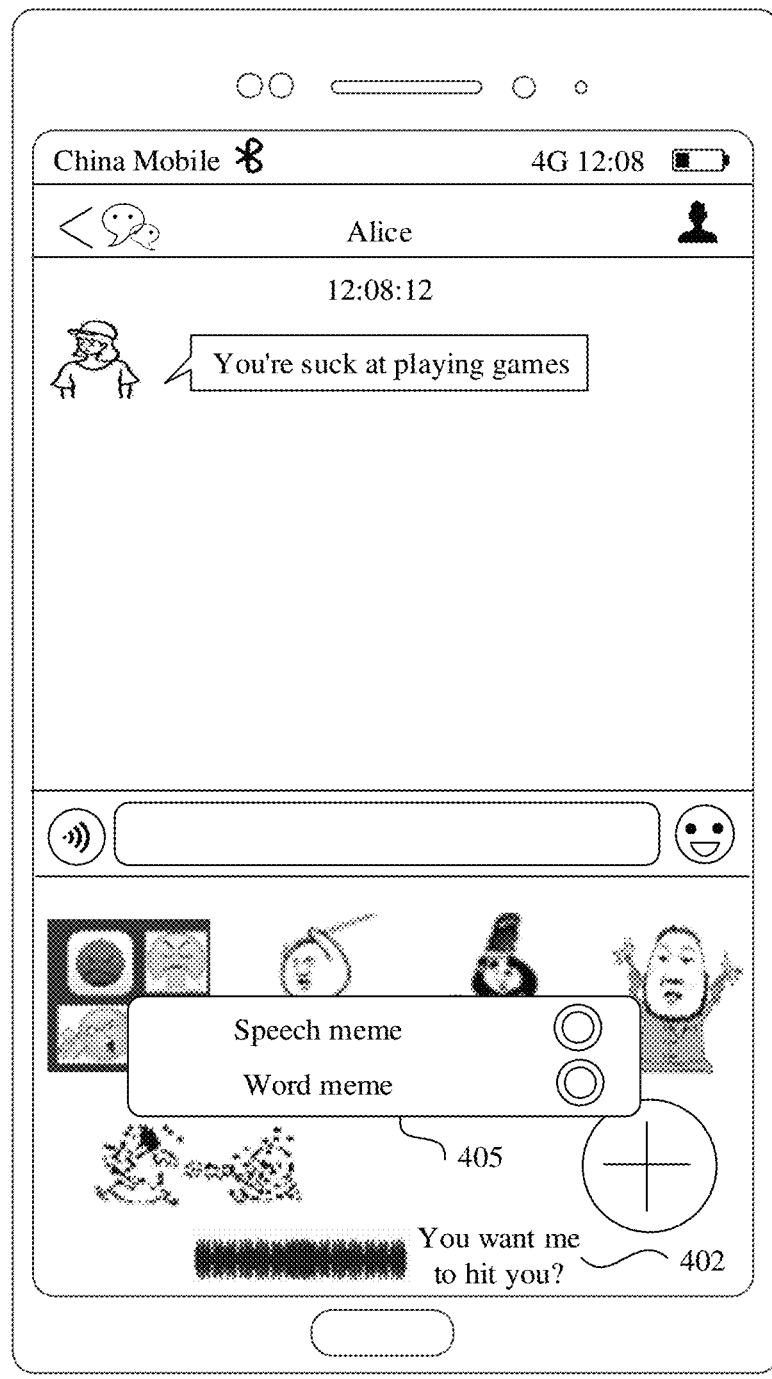
FIG. 7b is yet another schematic display diagram of a mobile phone according to an embodiment.

For example, as shown in FIG. 7b, in response to the operation of selecting one image meme from the first image meme set by the user, the mobile phone may display a pop-up box 405, where the pop-up box 405 may include a speech meme option and a word meme option. In response to an operation of creating the speech meme that is triggered by the user, the target meme is obtained based on the image meme selected by the user and the speech. In response to an operation of creating the word meme that is triggered by the user, the target meme is obtained based on the image meme selected by the user and the semantics corresponding to the speech.

Figure 8A:
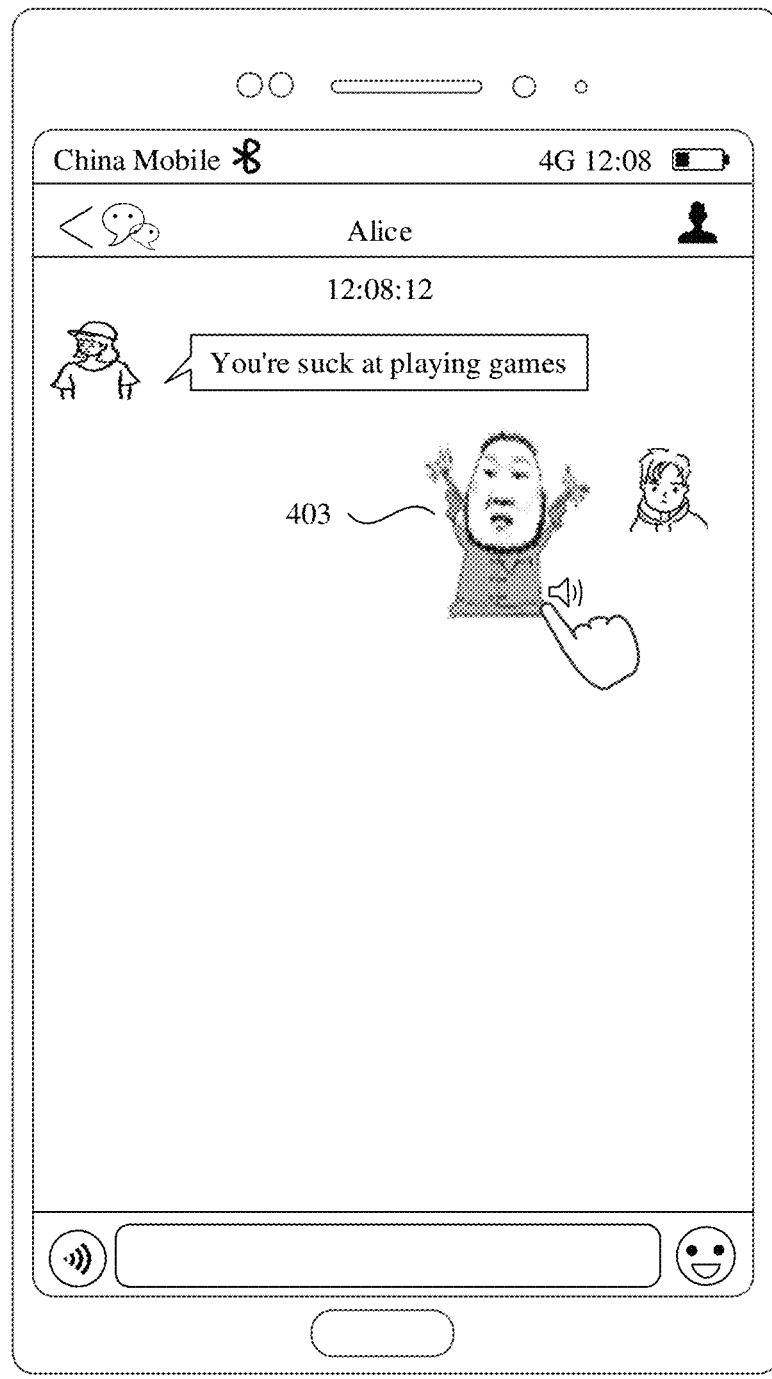
FIG. 8a is yet another schematic display diagram of a mobile phone according to an embodiment.
Figure 8B:
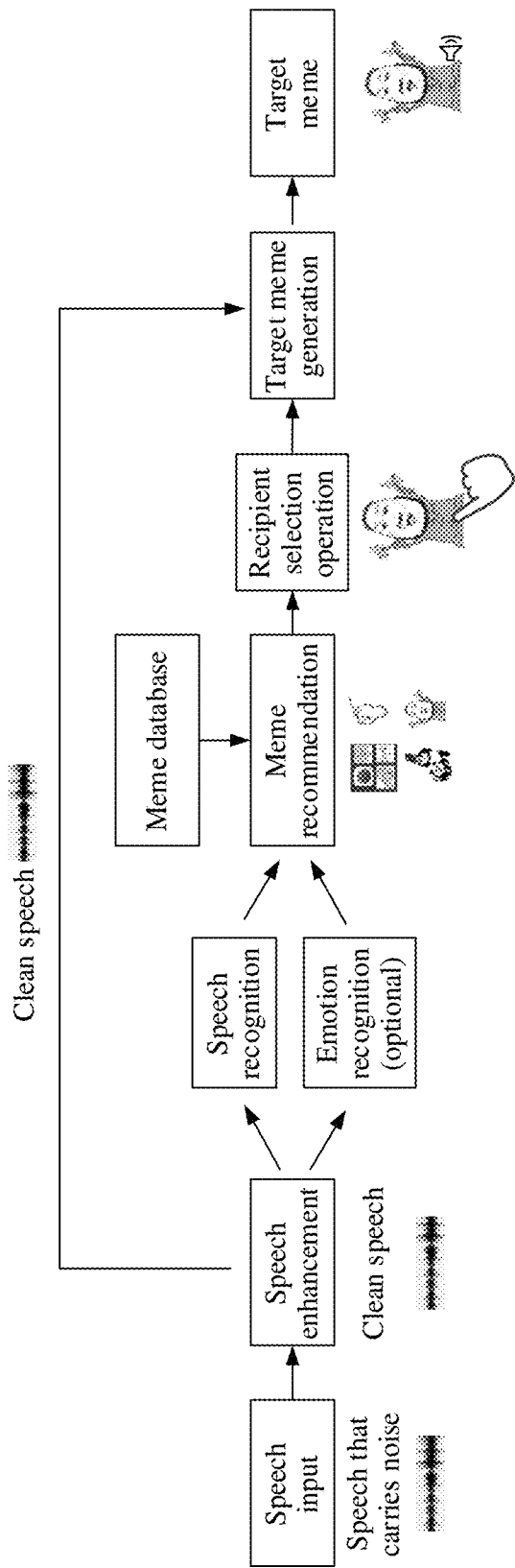
FIG. 8b is a schematic flowchart of generating a target meme according to an embodiment.

A process in which the mobile phone obtains the target meme based on the image meme selected by the user and the speech may be: encoding and compressing the speech input by the user, and adding a preset identifier to a preset position of the image meme selected by the user, where the preset identifier indicates that the target meme is a speech meme, for example, a small horn icon may be added to a blank area of the image meme to prompt the user that the speech exists; and then loading, as video formats, an encoded and compressed speech and the image meme to which the preset identifier is added, to obtain the target meme. The user may choose to store or send the target meme. For example, as shown in FIG. 8a, after sending the target meme, the mobile phone may display a target meme 403 in a chat interface. The target meme 403 may include a speech icon, to prompt that the speech meme carries a speech. The user may trigger the target meme to play the speech. For example, the user may tap (single-tap, double-tap, or the like) the speech icon of the target meme to play the speech. FIG. 8b is a flowchart of generating a target meme. The target meme may carry the speech input by the user. For a process, refer to the foregoing related descriptions. Details are not described herein again.

A process in which the mobile phone obtains the target meme based on the image meme selected by the user and the semantics corresponding to the speech may be: converting all words corresponding to the speech or the target keyword into pixel information; and loading the pixel information into a preset area or a blank area of the image meme selected by the user. The preset area may be an edge area such as a lower part, an upper part, a left part, or a right part of the image meme. If the words need to be loaded into the blank area, the mobile phone may first recognize the blank area of the image meme, then adapt a size of the words based on a size of the blank area and embed the words into the blank area.

Optionally, before embedding all the words corresponding to the speech or the target keyword into the image meme selected by the user, the mobile phone may identify whether the image meme selected by the user includes words. If the image meme selected by the user does not include words or words included in the image meme selected by the user are different from the words corresponding to the speech input by the user, the mobile phone embeds all the words corresponding to the speech or the target keyword into the image meme selected by the user, to obtain the target meme.

The mobile phone may automatically embed the words corresponding to the speech input by the user into the image meme selected by the user; or the mobile phone may provide a button for embedding words, so that the user manually embeds the words corresponding to the speech into the image meme selected by the user. Then, the mobile phone may display a preview interface, where the preview interface includes the target meme, and the words corresponding to the speech are included at a preset position of the target meme.

Figure 9A:
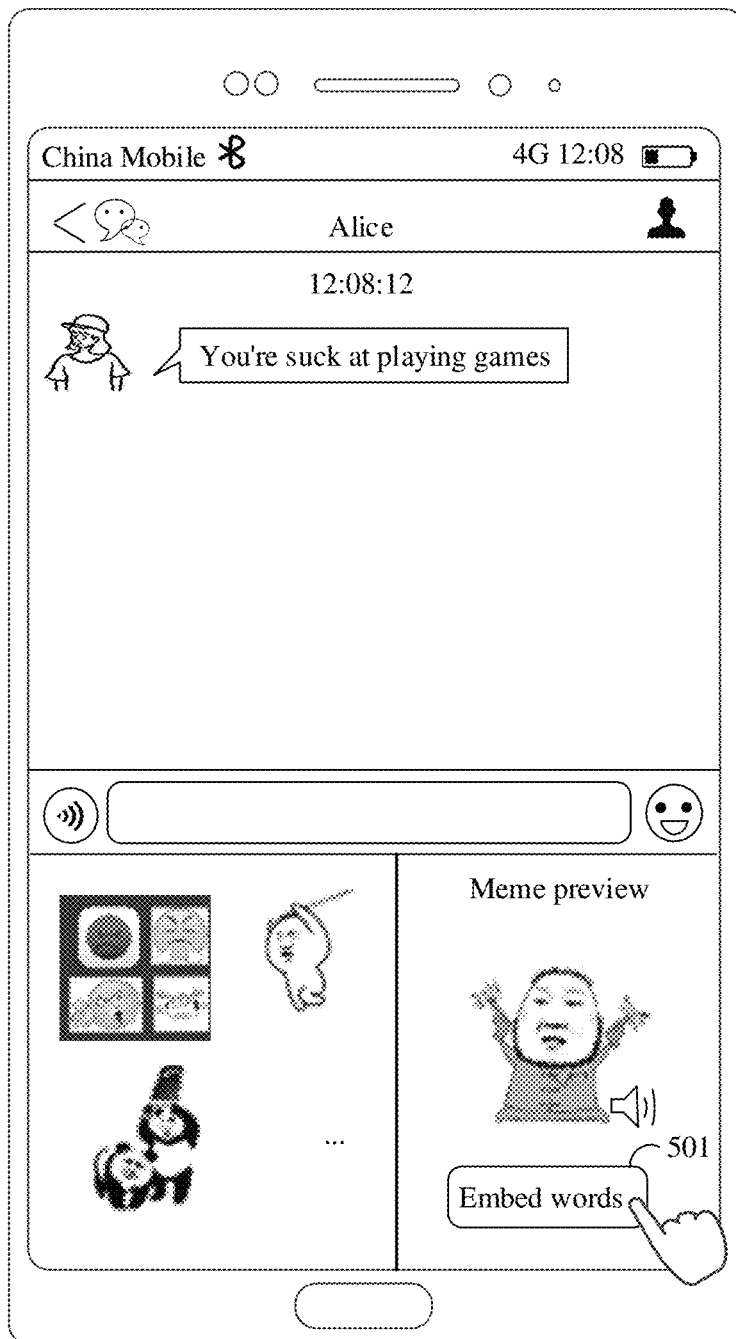
FIG. 9a(a) to FIG. 9a(c) are schematic display diagrams of a mobile phone according to an embodiment.
Figure 9A:
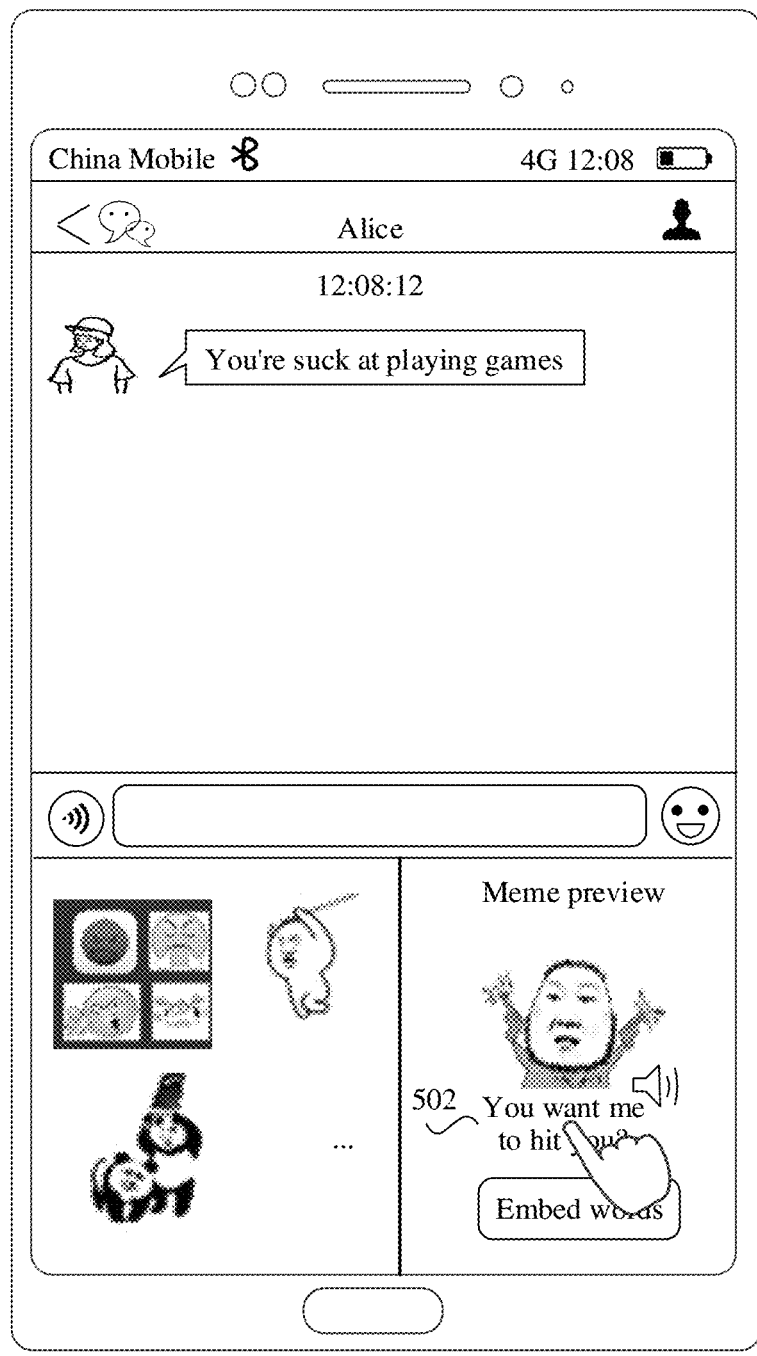
Figure 9A:
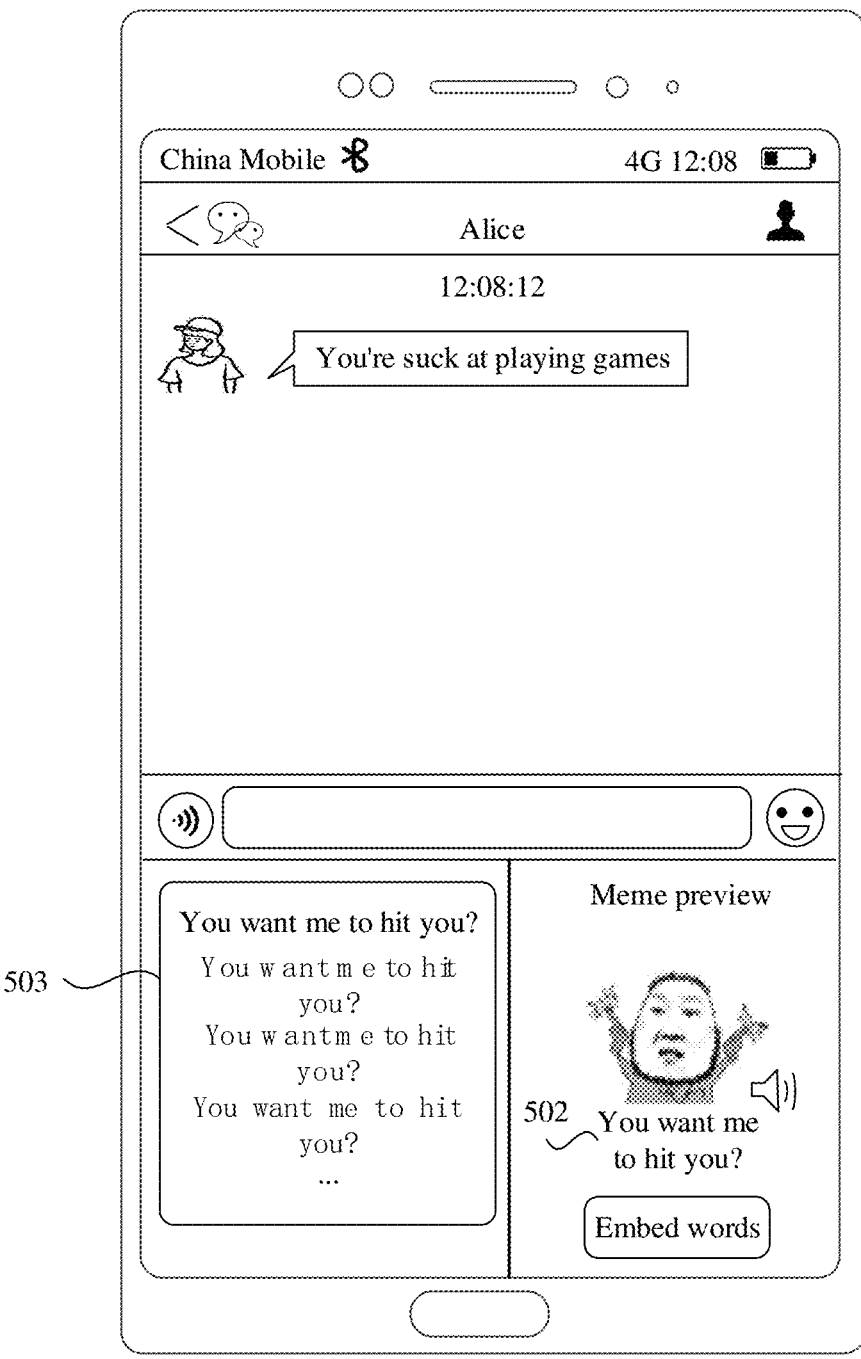

For example, as shown in FIG. 7a, after the user selects a meme 401, in response to an operation of selecting the meme 401 by the user, as shown in FIG. 9a(a), the mobile phone may display the preview interface of the target meme. The mobile phone may further display, in the preview interface, a button 501 for embedding words. In response to an operation of triggering the button 501 by the user, the mobile phone may embed the words corresponding to the speech into the preset area of the target meme, for example, below the target meme.

Optionally, the mobile phone may automatically set a color for the words based on a background color of the image meme selected by the user, so that the words are more eye-catching or closer to the background color of the meme. Alternatively, the user may set features such as fonts and colors for the words embedded in the image meme. For example, the user may perform editing processing such as font, size, bold, italic, WordArt, color, and underline processing on the words by touching and holding the embedded words, to better adapt to user requirements and improve user experience.

For example, as shown in FIG. 9a(b), the user may tap words 502 on the meme. As shown in FIG. 9a(c), the mobile phone may pop up a pop-up box 503. The pop-up box 503 may include a plurality of preset word formats for the words 502. The user may select a word format based on a preference of the user. The mobile phone may modify, based on the word format selected by the user, a format of the words embedded in the speech meme. Optionally, the user may further set various fonts, text boxes, or animation effects for the words. This is not limited.

Optionally, in a word embedding process, the user may also control a position and a rotation angle of the words embedded in a meme package picture. If the meme package is a GIF animation, an animation effect of the words may be edited and processed to match a behavior habit, a preference, and the like of the user.

Figure 9B:
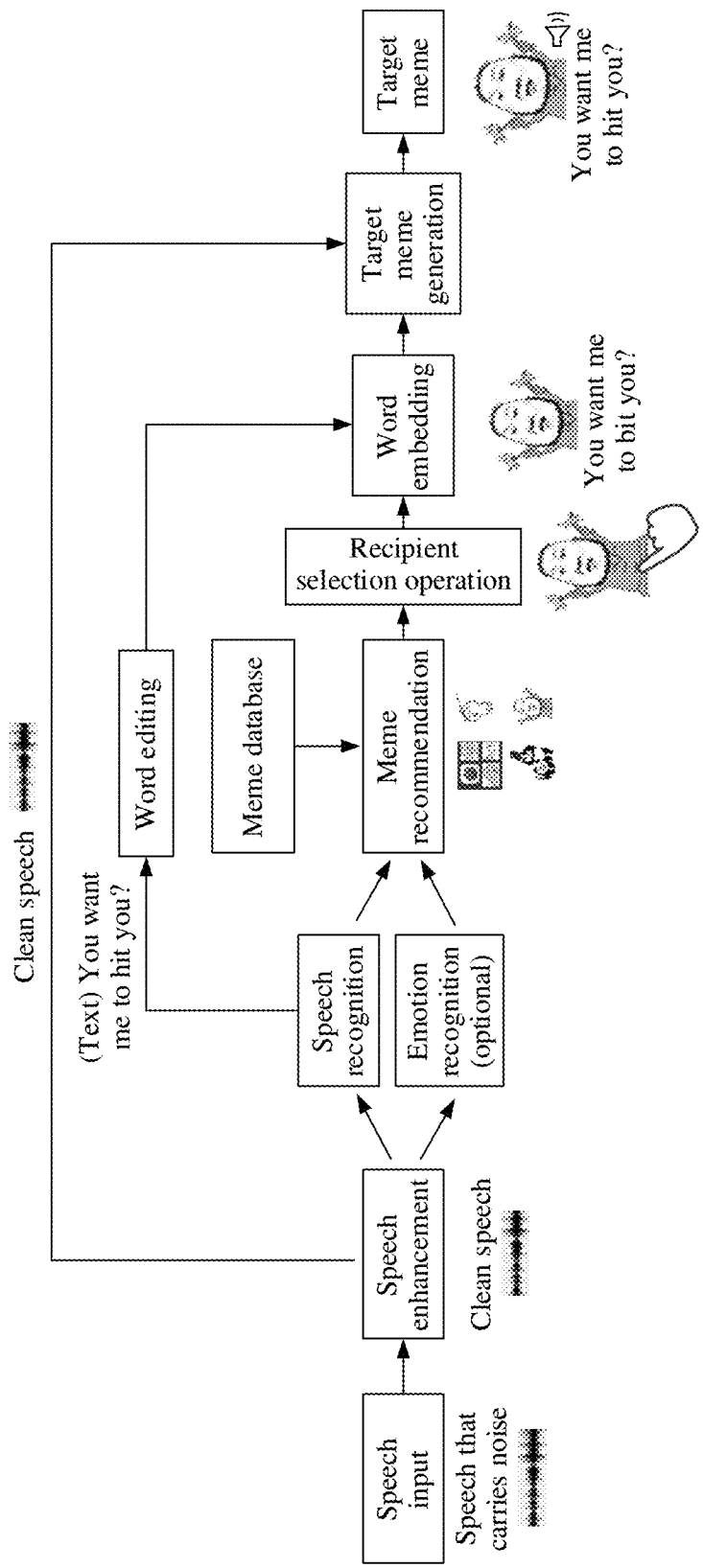
FIG. 9b is another schematic flowchart of generating a target meme according to an embodiment.

In some embodiments, the mobile phone may further embed both the speech and the words corresponding to the speech into the image meme selected by the user, to obtain the target meme. For a process, refer to the foregoing related descriptions. Details are not described herein again. FIG. 9b is a flowchart of generating a target meme. The target meme includes the speech input by the user and word information (all the words or the keyword) corresponding to the speech input by the user. For a process, refer to the foregoing related descriptions. Details are not described herein again.

If the target meme is the speech meme, in other words, the preset identifier (for example, the small horn icon) is included at the preset position of the target meme, after receiving the operation of triggering the target meme by the user, the mobile phone may play the speech carried in the target meme. For example, the user may tap (single-tap, double-tap, or the like) the preset identifier of the target meme to play the speech.

Figure 9C:
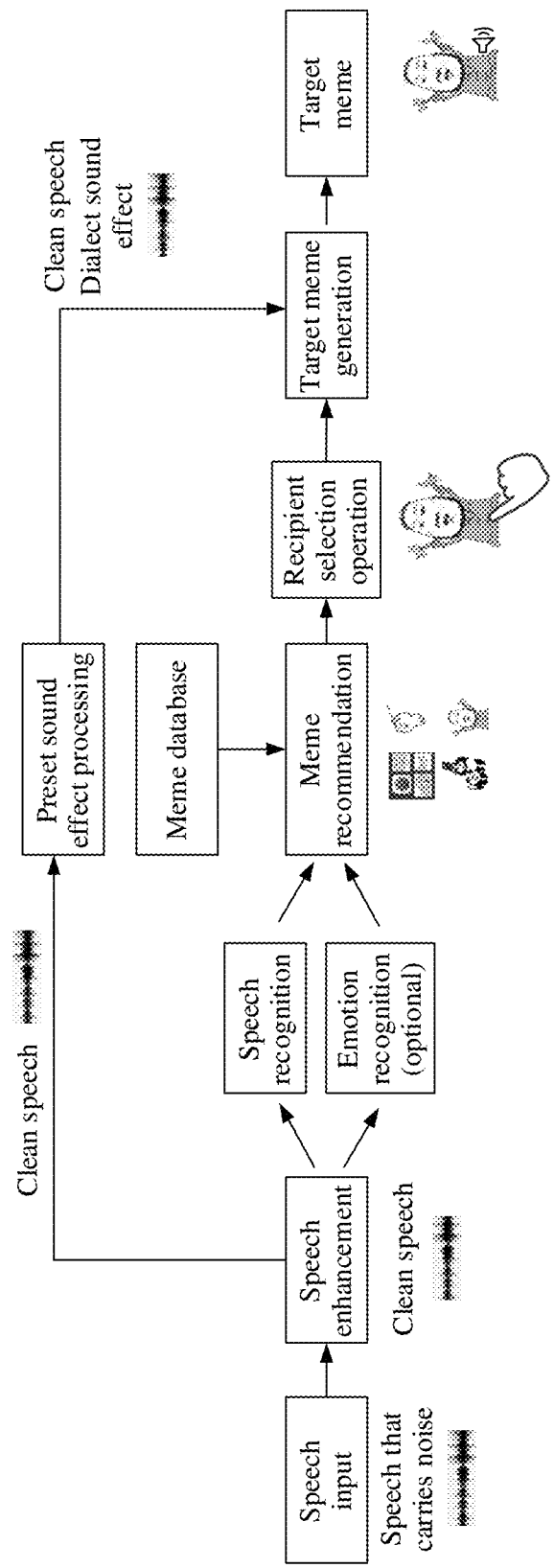
FIG. 9c is still another schematic flowchart of generating a target meme according to an embodiment.

Preset sound effect processing may be further performed on the speech of the target meme. The preset sound effect processing may include at least one of male-voice processing (for example, an uncle sound effect), female-voice processing (for example, a Loli sound effect or a goddess sound effect), animation figure voice processing, dialect processing, funny voice processing (for example, a dog sound effect or a cat sound effect), celebrity voice processing, or emotional processing. FIG. 9c is a flowchart of generating a target meme. The target meme may carry the speech input by the user, and the speech may have a dialect sound effect (for example, a Henan dialect sound effect).

Figure 10:
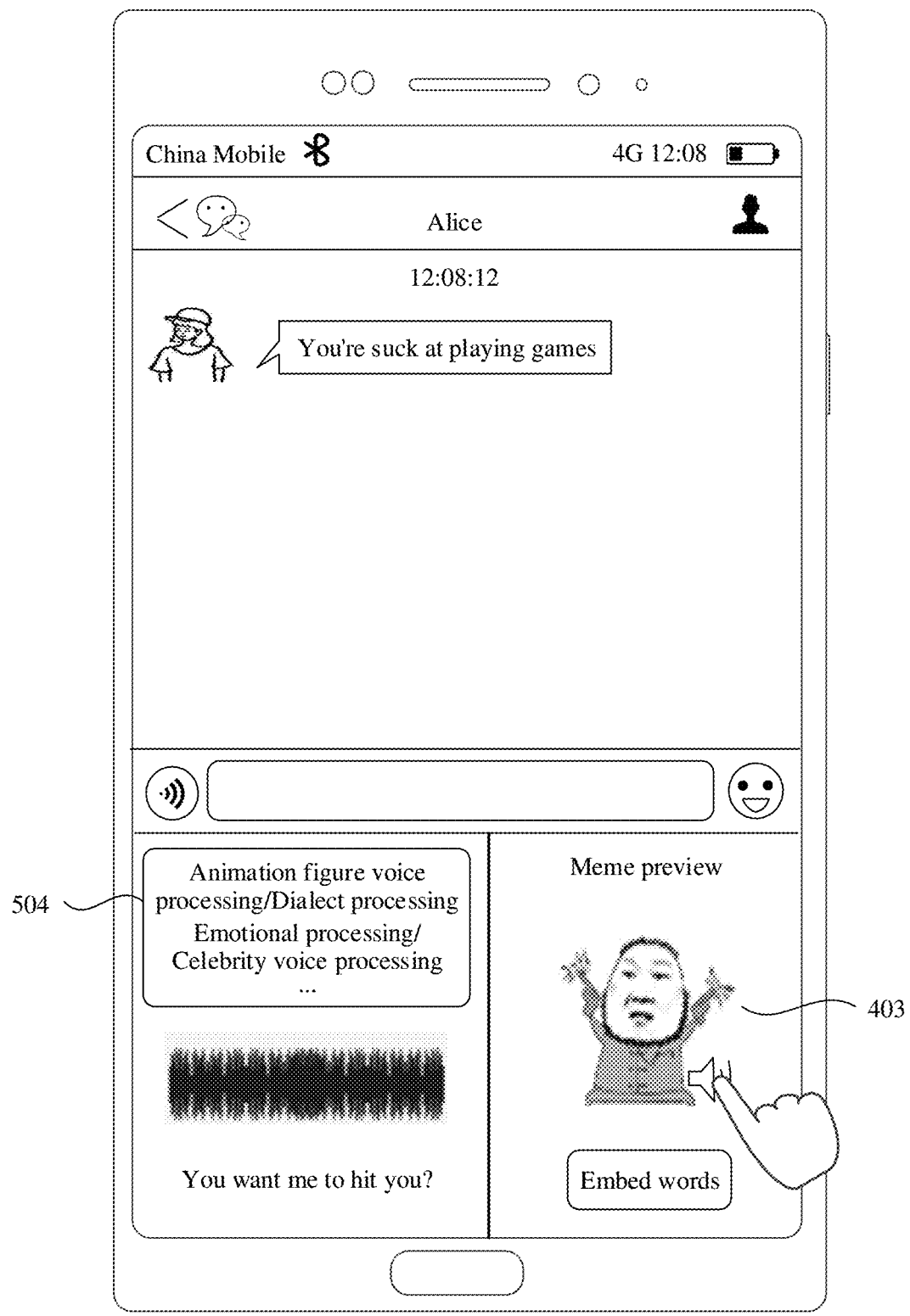
FIG. 10 is yet another schematic display diagram of a mobile phone according to an embodiment.

For example, as shown in FIG. 10, the user may tap a speech icon on a speech meme 403, and the mobile phone may display a pop-up box 504 in response to an operation of tapping the speech icon by the user. In the pop-up box 504, a plurality of preset sound effects may be included. The user may select a sound effect based on a preference of the user. The mobile phone may correspondingly process the speech of the speech meme 403 based on the sound effect selected by the user, to better adapt to user requirements and improve user experience.

In some embodiments, the mobile phone may perform preset sound effect processing on the speech based on a third meme label of the image meme selected by the user, where the third meme label indicates a type of the image meme selected by the user.

If the third meme label of the image meme selected by the user indicates a preset character type, the speech input by the user may be processed based on a sound feature of the preset character type. For example, if the third meme label indicates a crosstalk comedian XX, the mobile phone may modify, based on sound features such as a timbre, a pitch, a speaking speed, a volume, a tone, or a voiceprint of the crosstalk comedian XX, the speech input by the user. If the third meme label of the image meme selected by the user indicates a preset animal type, funny voice processing or animation figure voice processing is performed on a timbre of the speech. For example, if the third meme label of the image meme selected by the user indicates a cat, a cat sound effect may be added to the speech input by the user. In this way, personalized sound effect processing is performed on the speech input by the user, so that the target meme can be expressed in a richer and more interesting manner.

It may be understood that the mobile phone may pre-store a sound effect corresponding to a third meme label of each image meme. For example, if the third meme label indicates a crosstalk comedian XX, the mobile phone may store features of the crosstalk comedian XX, such as a timbre, a pitch, a speaking speed, a volume, a tone, or a voiceprint. If the third meme label indicates an animal such as a cat or a dog, the mobile phone may store a corresponding cat sound effect or dog sound effect.

After receiving the operation of selecting one image meme by the user, the mobile phone may further receive an operation of selecting a picture by the user and may load a target area in the picture to the preset position of the image meme selected by the user. For example, as shown in FIG. 9a(a), a picture embedding button (not shown in FIG. 9a(a)) may be configured beside a word embedding button 501. In response to an operation of selecting the picture embedding button by the user, the mobile phone may invoke a system album for the user to select a picture. After the user selects the picture, the mobile phone may cover a target area in the picture selected by the user on the image meme selected by the user, to obtain a customized meme. The target area may be an area that includes a face. After the user selects a picture that includes a face, the mobile phone may cover the face area in the picture selected by the user at the preset position of the image meme selected by the user, to obtain the customized meme. The mobile phone may automatically identify the face area of the picture selected by the user, or the user may manually select the face area. This is not limited. In this way, based on the memes recommended by the mobile phone, the user may select a meme to perform personalized design, and generate the target meme (the speech meme or the word meme) based on a customized meme obtained through the personalized design. This is more entertaining and can improve user experience.

After receiving the operation of selecting one image meme by the user, the mobile phone may further receive operations, such as doodling or pasting a "sticker" (for example, adding sticker patterns such as love, stars, and balloons to an original image meme), of the user on the image meme, and generate the target meme based on an image meme obtained through doodling or by pasting the "sticker". In this way, based on the memes recommended by the mobile phone, the user may select a meme to perform personalized design, and generate the target meme (the speech meme or the word meme) based on the customized meme obtained through the personalized design. This is more entertaining and can improve user experience.

Further, the mobile phone may store the generated target meme, and generate a speech meme sending record. When the user needs to send a speech meme next time, the mobile phone may display speech memes previously sent by the user, so that the user can directly select a speech meme for sending. This is more convenient and faster.

In some embodiments, if the user considers that the image meme recommended by the mobile phone does not meet an expectation or does not match a current scenario and does not select one image meme from the at least one image meme, the user may trigger a customized meme mode. The mobile phone displays a drawing board interface in response to a third operation of triggering the customized meme mode by the user, receives a doodle operation performed by the user in the drawing board interface, and generates a stick figure based on a moving track of the doodle operation.

Figure 11A:
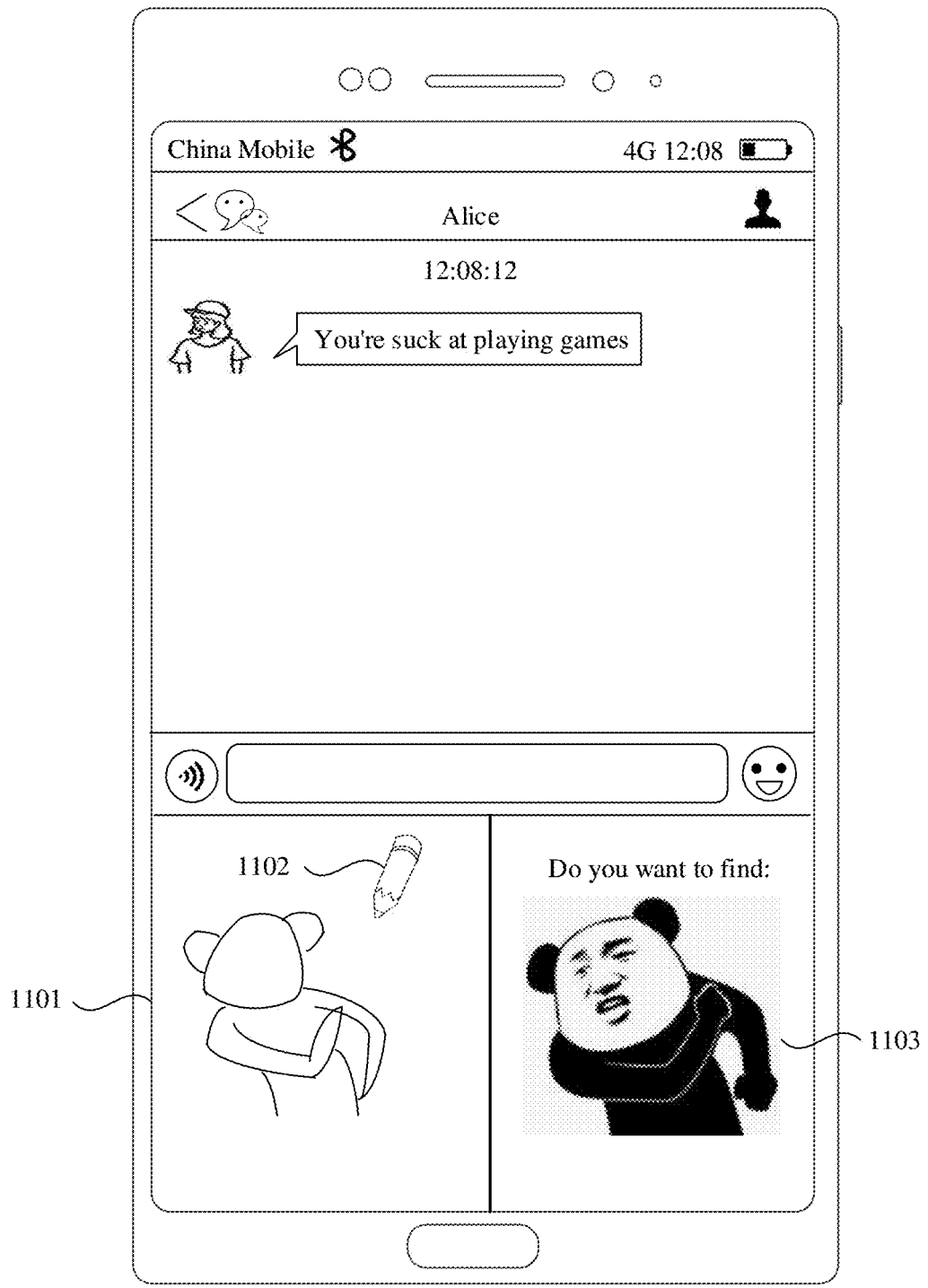
FIG. 11a is yet another schematic display diagram of a mobile phone according to an embodiment.

For example, as shown in FIG. 7a, when displaying the recommended at least one image meme, the mobile phone may display a customized control 404. If the user is not satisfied with the image meme recommended by the mobile phone, the user may tap the control 404 to trigger the customized meme mode. As shown in FIG. 11a, the mobile phone may display a drawing board interface 1101 in response to an operation (the third operation) of tapping the control 404 by the user. The user may trigger a brush control 1102 to doodle in the drawing board interface. The mobile phone receives a doodle operation performed by the user in the drawing board interface, and generates a stick figure based on a moving track of the doodle operation. Then, the mobile phone may recommend an image meme whose similarity to a contour of the stick figure is greater than a preset threshold. In response to an operation of selecting the image meme whose similarity is greater than the preset threshold by the user, the mobile phone may package the speech input by the user and the image meme selected by the user, to obtain the target meme; or embed all the words corresponding to the speech or the target keyword into the image meme selected by the user, to obtain the target meme. For example, as shown in FIG. 11a, the mobile phone may recommend an image meme 1103 similar to the stick figure to the user. If the user selects the image meme 1103, the mobile phone may generate the target meme based on the image meme 1103.

Figure 11B:
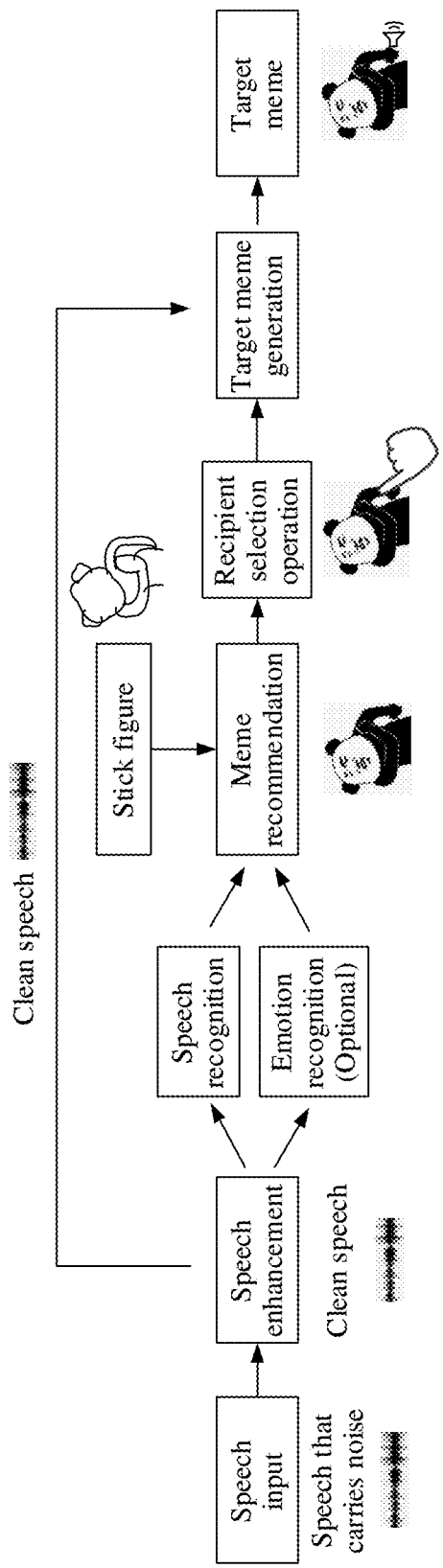
FIG. 11b is yet another schematic flowchart of generating a target meme according to an embodiment.

FIG. 11b is a flowchart of generating a target meme. The target meme carries the speech input by the user, and image information of the target meme may be recommended based on the stick figure drawn by the user. For a process, refer to the foregoing related descriptions. Details are not described herein again.

In addition, the mobile phone may alternatively render, based on a generative adversarial network (GAN), the stick figure to obtain a personalized meme, and generate the target meme based on the personalized meme. Alternatively, the mobile phone may directly generate the speech meme based on the stick figure. This is not limited.

In some embodiments, if the user considers that the image meme recommended by the mobile phone does not meet an expectation or does not match a current scenario and does not select one image meme from the at least one image meme, the user may alternatively select one image meme from locally stored image memes.

404: Send the target meme.

The mobile phone may send the target meme to an electronic device corresponding to the target contact; or may upload the target meme to a server corresponding to an application program that provides the content sharing interface or the comment interface.

After the mobile phone detects an operation of triggering sending of the target meme by the user, for example, after the mobile phone detects an upstroke or touch-and-hold operation of the user on the speech meme, the mobile phone may send the target meme, for example, may forward the target meme to a corresponding contact (for example, Alice). An electronic device used by Alice may receive the target meme and display the target meme in the chat interface. If a second electronic device receives an operation of triggering a speech identifier of the target meme by Alice, the second electronic device may invoke a speaker to input the speech carried in the meme. In this way, the user can hear the speech in the speech meme. The operation of triggering the speech identifier of the meme may include a tap operation, a slide operation, a touch and hold operation, or the like. The tap operation may include a single tap operation, a continuous tap operation, or the like. This is not limited.

In addition, in the foregoing embodiments, the chat scenario is used as an example to describe a method for sending a meme. It may be understood that the foregoing method may also be applied to social scenarios such as blog posting, mood posting, replying, or comment. For example, when posting a blog, the user may insert a speech meme when posting words. In other words, content of the blog includes the words and the speech meme. Further, the content of the blog may further include a picture, a video, and the like. This is not limited in the embodiments.

According to the method provided in this embodiment, after receiving the speech input by the user, the mobile phone may perform content recognition on the speech. If the speech includes the target keyword, the mobile phone recommends the first image meme set to the user. The first meme label of each image meme in the first image meme set has the matching relationship with the target keyword. In this manner of automatically recommending an image meme based on the speech input by the user, a user operation can be simplified, and the user does not need to select an image meme from massive image memes, so that the user operation is more convenient. Then, in response to the operation of selecting one image meme from the first image meme set by the user, the target meme may be obtained based on the image meme selected by the user and the speech. As another carrier for information, the speech can transmit rich content and bring more entertainment. In this way, forms and content of memes are enriched. The target meme includes both the speech information and the image information, so that information transmission is more natural, and emotion expression is more real. Alternatively, the mobile phone may embed all the words corresponding to the speech or the target keyword into the image meme selected by the user, to obtain the target meme. In this way, the target meme includes both the image information and the word information corresponding to the speech, so that intent of the user can be transferred and expressed more accurately, and user experience can be improved. In addition, speech control does not require a gesture operation, and is very suitable for a scenario in which the user uses an electronic device when driving.

Figure 12:
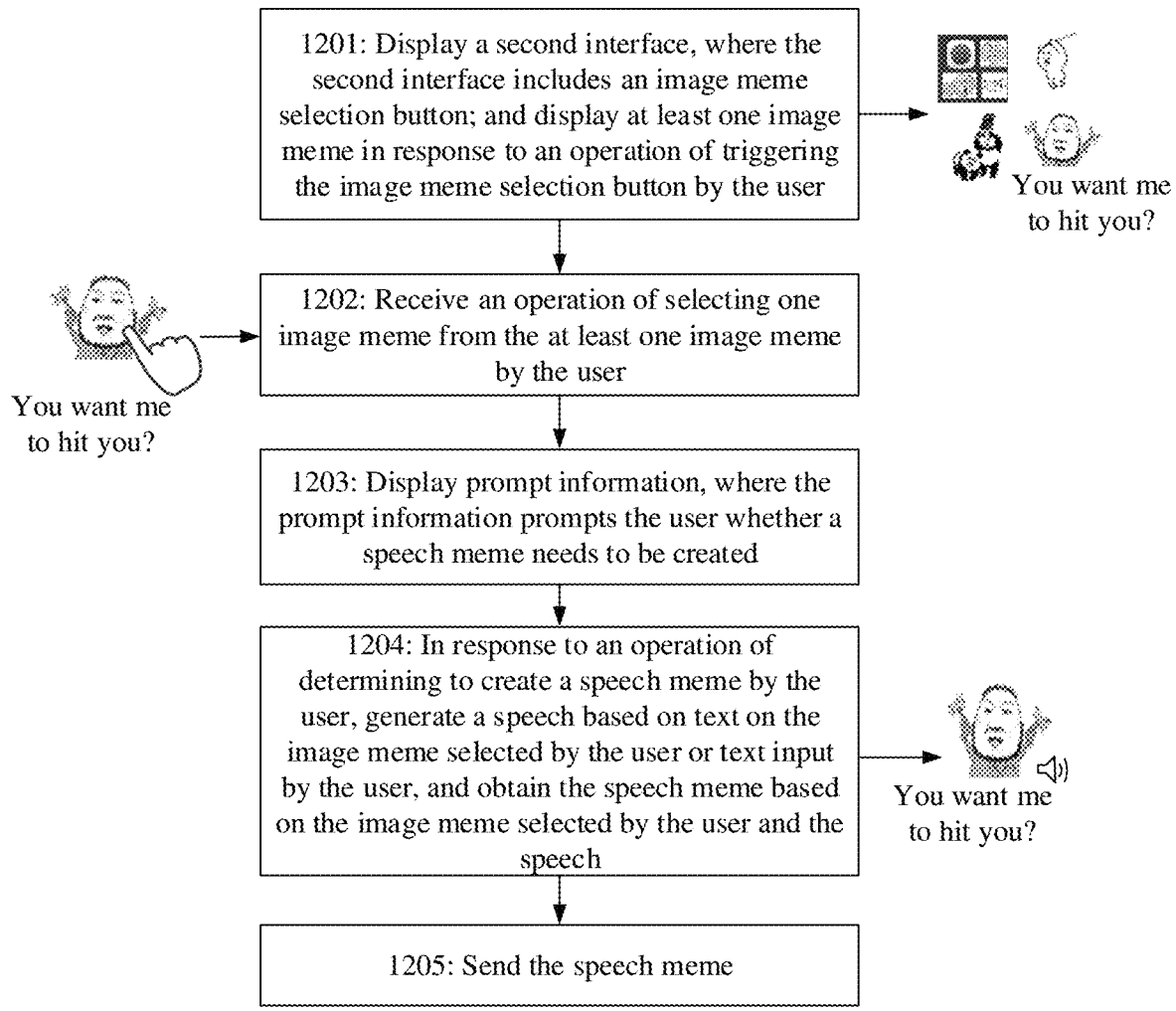
FIG. 12 is another schematic flowchart applicable to a meme creation method according to an embodiment.

In some other embodiments, as shown in FIG. 12, a method for sending a meme is provided. An example in which an electronic device is a mobile phone is used for description, and the method includes the following steps.

1201: Display a second interface, where the second interface includes an image meme selection button; and display at least one image meme in response to an operation of triggering the image meme selection button by a user.

The second interface may be a dialog interface with a target contact; or the second interface may be a content sharing interface; or the second interface may be a comment interface.

1202: Receive an operation of selecting one image meme from the at least one image meme by the user.

For example, the user may select one image meme from stickers provided by the mobile phone or locally stored image memes.

1203: Display prompt information, where the prompt information prompts the user whether a speech meme needs to be created.

Figure 13A:
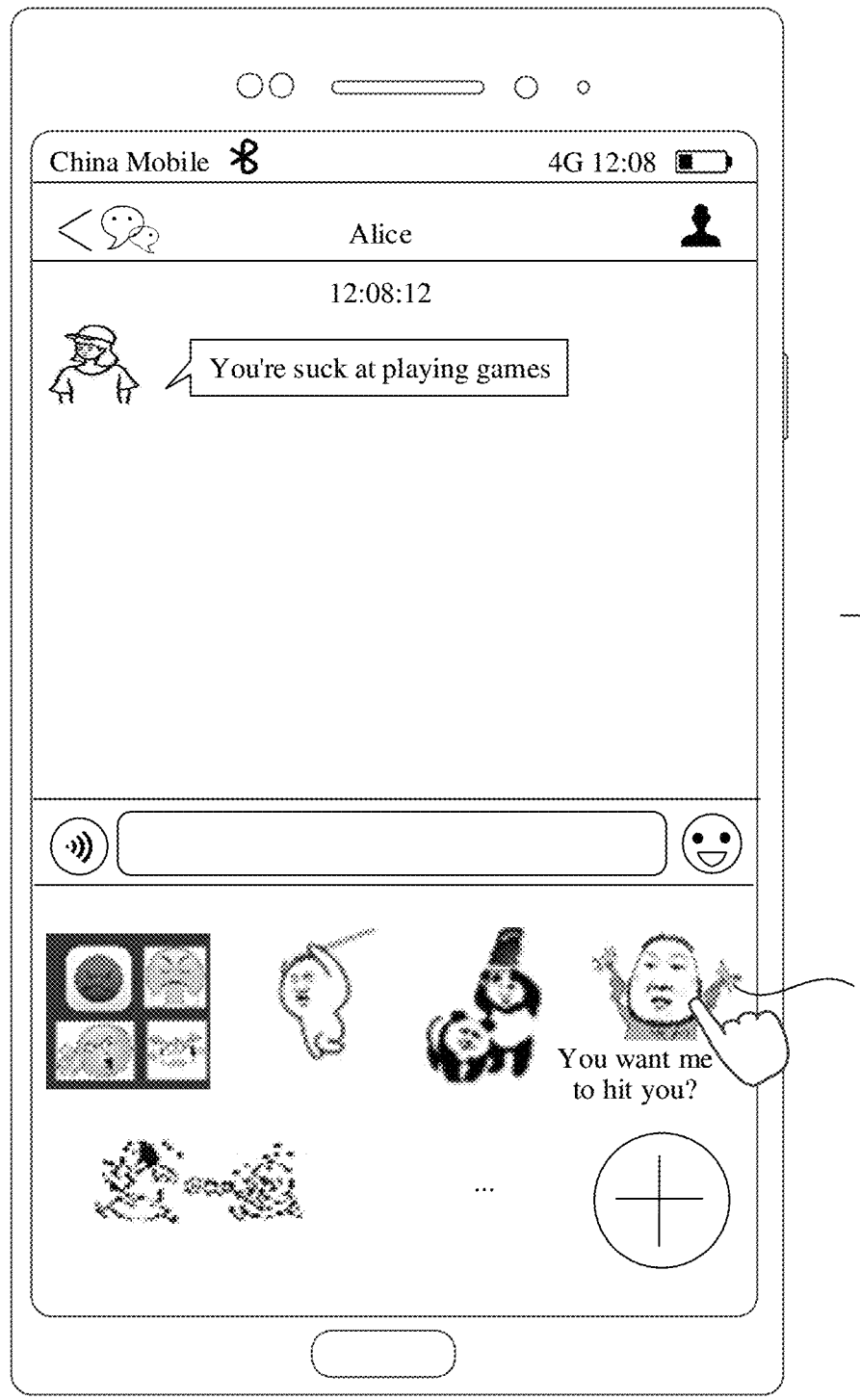
FIG. 13(a) and FIG. 13(b) are schematic display diagrams of a mobile phone according to an embodiment.
Figure 13B:
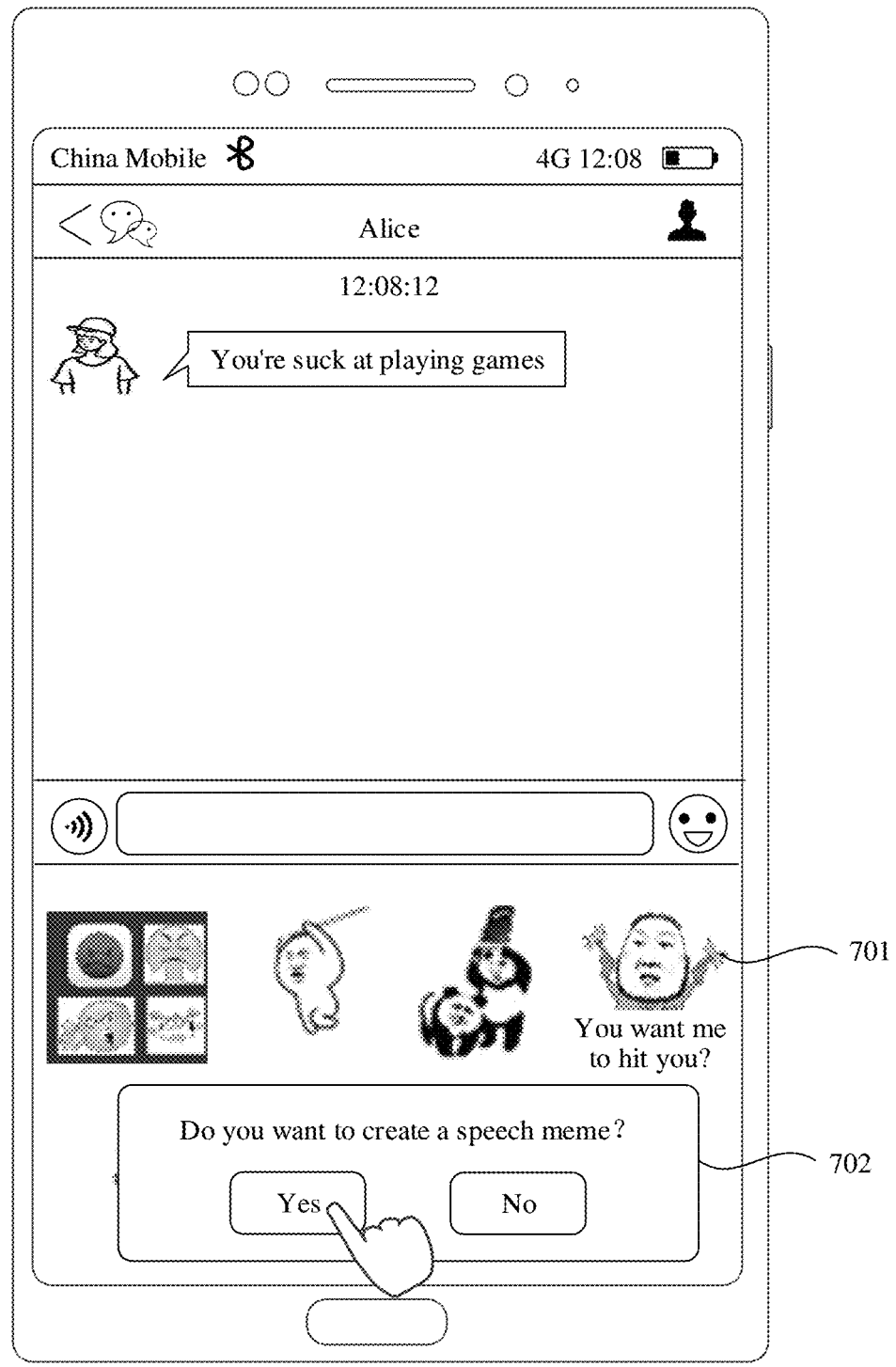

For example, as shown in FIG. 13(*a*), the mobile phone may display the prompt information in response to an operation of selecting an image meme 701 that carries words by the user. For example, as shown in FIG. 13(*b*), the prompt information may be a prompt box 702. The prompt box 702 may include prompt words "do you want to create a speech meme?", and the prompt box may further include buttons of "Yes" and "No". If the user taps the button of "Yes", the mobile phone determines that the user needs to create a speech meme, and the mobile phone performs step 1204. If the user taps the button of "No", the mobile phone may directly send the meme selected by the user to a peer contact.

1204: In response to an operation of determining to create a speech meme by the user, generate a speech based on words on the image meme selected by the user or words input by the user, and obtain the speech meme based on the image meme selected by the user and the speech.

Figure 14:
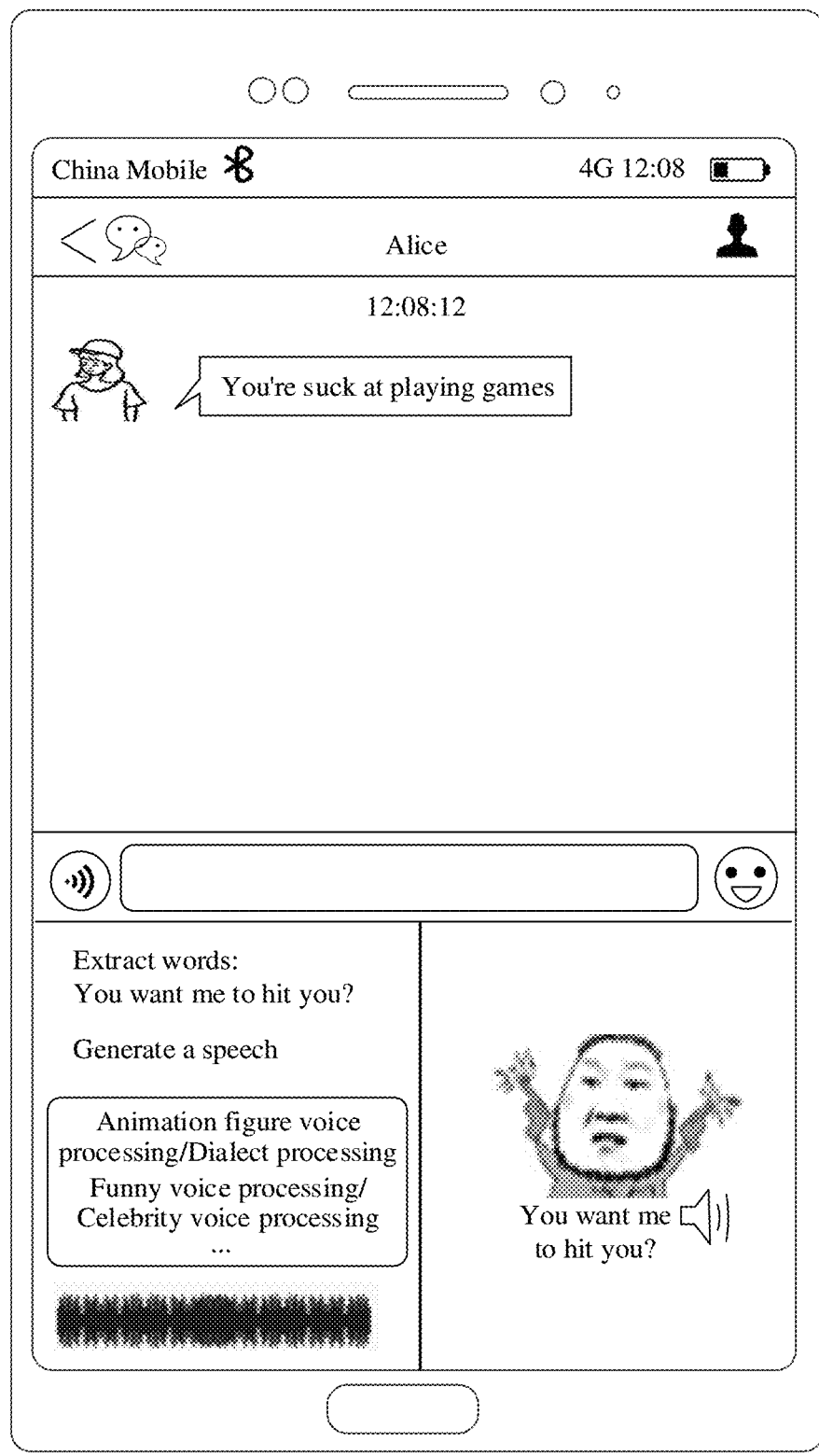
FIG. 14 is yet another schematic display diagram of a mobile phone according to an embodiment.

The mobile phone may recognize and extract the words on the image meme by using an optical character recognition technology, generate the speech based on the recognized words, and then obtain the speech meme based on the image meme selected by the user and the speech. For example, as shown in FIG. 14, the words extracted by the mobile phone from the image meme may be "you want me to hit you?", and a corresponding speech may be generated based on the words.

Alternatively, the mobile phone may receive text input by the user, for example, may receive words input by the user through a soft keyboard or words copied and pasted by the user, generate a speech based on the words, and then obtain the speech meme based on the image meme selected by the user and the speech.

Optionally, the mobile phone may further perform preset sound effect processing or personalized processing on the generated speech. For a description, refer to step 403.

Details are not described herein again. Then, the mobile phone may generate the speech meme based on the image meme and a speech that is obtained through preset sound effect processing or personalized processing.

Figure 15:
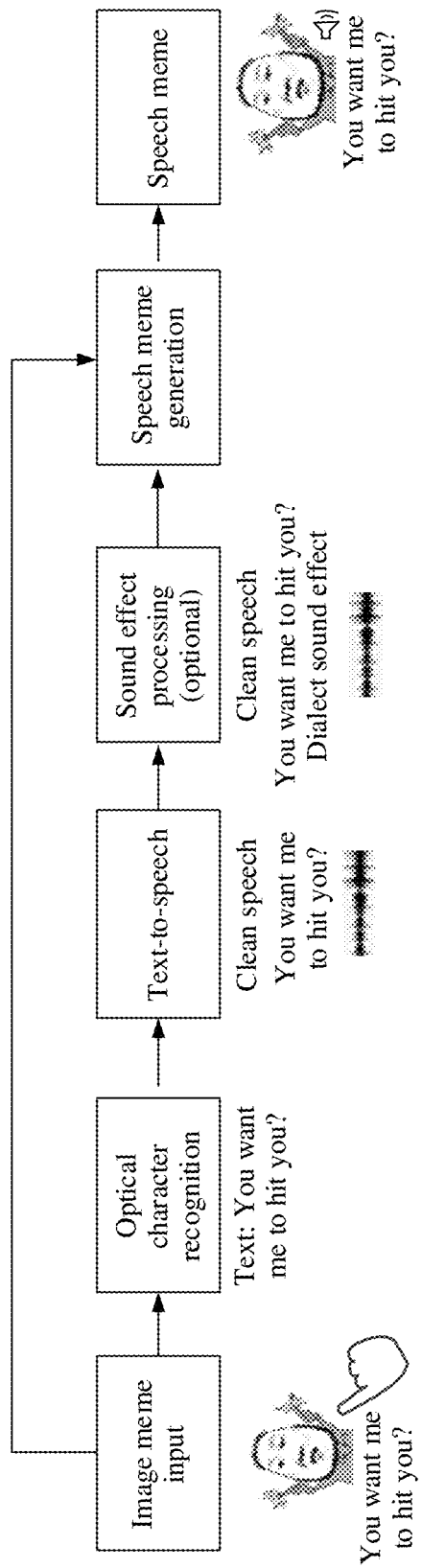
FIG. 15 is a schematic flowchart of generating a speech meme according to an embodiment.

FIG. 15 is a flowchart of generating a speech meme based on an image meme that carries words and that is selected by the user. The speech meme carries a corresponding speech generated based on the words, and the speech may have a dialectic sound effect (for example, a Henan dialect sound effect). For a process, refer to the foregoing related descriptions. Details are not described herein again.

1205: Send the speech meme.

For a description, refer to step 404. Details are not described herein again.

According to the method provided in this embodiment, after receiving the operation of selecting an image meme by the user, the mobile phone may generate the speech based on the words on the image meme or the text input by the user and obtain the speech meme based on the speech and the image meme, and the user does not need to input a speech. This simplifies operation steps of the user, the speech meme can be conveniently and intelligently generated, forms and content of memes are enriched, and user experience can be improved.

The foregoing describes the solutions provided in the embodiments from a perspective of the electronic device. It may be understood that, to implement the foregoing functions, the electronic device includes a corresponding hardware structure and/or software module for performing each of the functions. A person skilled in the art should easily be aware that, in combination with the algorithm steps described in the embodiments, the embodiments can be implemented by hardware or a combination of hardware and computer software. Whether a function is performed by hardware or hardware driven by computer software depends on particular applications and design constraints of the solutions. The person skilled in the art may use different methods to implement the described functions for each particular application, but it should not be considered that the implementation goes beyond the scope of the embodiments.

In the embodiments, functional modules in the electronic device may be defined based on the foregoing method examples. For example, each functional module may be defined in correspondence to each function, or two or more functions may be integrated in one processing module. The integrated module may be implemented in a form of hardware or may be implemented in a form of a software functional module. It should be noted that, in the embodiments, division into the modules is an example, and is merely a logical functional division. In actual implementation, another division manner may be used.

Figure 16:
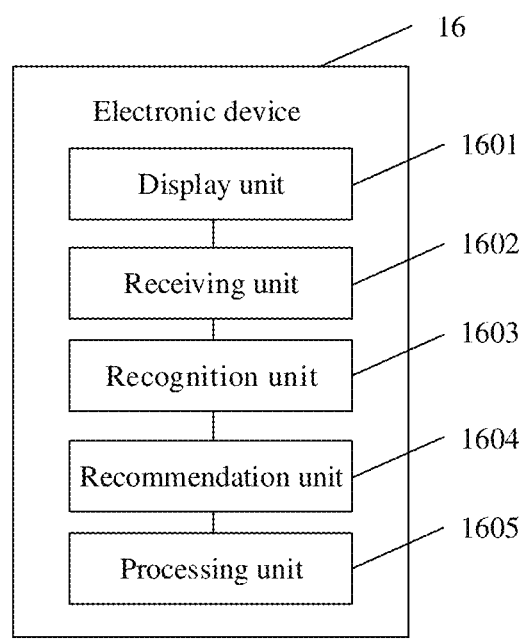
FIG. 16 is another schematic diagram of a structure of an electronic device according to an embodiment.

When each functional module is obtained through division based on each corresponding function, FIG. 16 is a possible schematic diagram of composition of an electronic device 16 in the foregoing embodiments. The electronic device 16 may include a display unit 1601, a receiving unit 1602, a recognition unit 1603, a recommendation unit 1604, and a processing unit 1605. In this embodiment, the display unit 1601 is configured to display a first interface, where the first interface includes a speech input button. The receiving unit 1602 is configured to receive, in response to an operation of triggering the speech input button by a user, a speech input by the user. The recognition unit 1603 is configured to recognize the speech in a preset manner, where recognition in the preset manner includes at least content recognition. The recommendation unit 1604 is configured to: if the speech includes a target keyword, recommend a first image meme set to the user, where a first meme label of each image meme in the first image meme set has a matching relationship with the target keyword. The processing unit 1605 is configured to: in response to the operation of selecting one image meme from the first image meme set by the user, obtain a target meme based on the image meme selected by the user and the speech or semantics corresponding to the speech.

When an integrated unit is used, the electronic device may include a processing module, a storage module, and a communication module. The processing module may be configured to control and manage an action of the electronic device. For example, the processing module may be configured to support the electronic device to perform the steps performed by the display unit 1601, the receiving unit 1602, the recognition unit 1603, the recommendation unit 1604, and the processing unit 1605. The storage module may be configured to support the electronic device to store program code, data, and the like. The communication module may be configured to support communication between the electronic device and another device.

The processing module may be a processor or a controller. The processing module may implement or execute various example logical blocks, modules, and circuits described with reference to the content. The processor may alternatively be a combination, for example, a combination including one or more microprocessors or a combination of digital signal processing (DSP) and a microprocessor, for implementing a computing function. A storage module may be a memory. The communication module may be a device that interacts with another electronic device, such as a radio frequency circuit, a Bluetooth chip, or a Wi-Fi chip.

An embodiment further provides a computer storage medium. The computer storage medium stores computer instructions. When the computer instructions are run on an electronic device, the electronic device is enabled to perform the foregoing related method steps, to implement the meme creation method in the foregoing embodiments.

An embodiment further provides a computer program product. When the computer program product runs on a computer, the computer is enabled to perform the foregoing related steps, to implement the meme creation method in the foregoing embodiments.

In addition, an embodiment further provides an apparatus. The apparatus may be a chip, a component, or a module. The apparatus may include a processor and a memory that are connected. The memory is configured to store computer-executable instructions, and when the apparatus runs, the processor may execute the computer-executable instructions stored in the memory, so that the chip performs the meme creation method in the foregoing method embodiments.

The electronic device, the computer storage medium, the computer program product, and the chip provided in the embodiments are all configured to perform a corresponding method provided above. Therefore, for beneficial effects that can be achieved by the electronic device, the computer storage medium, the computer program product, and the chip, refer to beneficial effects of the corresponding method provided above. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments, it should be understood that the apparatus and method may be implemented in other manners. For example, division into the modules or units is merely logical functional division. There may be another division manner in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located at one place, or may be distributed on different places. Some or all of the units may be selected based on actual requirements to achieve the objectives of the solutions in the embodiments.

In addition, functional units in the embodiments may be integrated into one processing unit, each of the units may exist alone physically, or two or more units are integrated into one unit. The integrated unit may be implemented in a form of hardware or may be implemented in a form of a software functional unit.

When the integrated unit is implemented in a form of a software functional unit and sold or used as an independent product, the integrated unit may be stored in a readable storage medium. Based on such an understanding, the embodiments, or the part contributing to the conventional technology, or all or some of the solutions may be implemented in the form of a software product. The software product is stored in a storage medium and includes several instructions for instructing a device (which may be a single-chip microcomputer, a chip, or the like) or a processor to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations, but are not intended as limiting. Any variation or replacement readily figured out by a person skilled in the art shall fall within the scope of the embodiments.

What is claimed is:

1. A meme creation method, applied to an electronic device, the meme creation method comprising:
   displaying a first interface, wherein the first interface comprises a speech input button; receiving, in response to an operation of triggering the speech input button by a user, a speech input by the user;
   recognizing the speech in a preset manner, wherein recognition in the preset manner comprises at least content recognition;
   after the speech comprises a target keyword, recommending a first image meme set to the user, wherein a first meme label of each image meme in the first image meme set has a matching relationship with the target keyword; and
   obtaining, in response to an operation of selecting one image meme from the first image meme set by the user, a target meme based on the image meme selected by the user and the speech or semantics corresponding to the speech;
   wherein, after the user does not select one image meme from the first image meme set, further comprising:
   displaying a drawing board interface in response to an operation of triggering a customized meme mode by the user;
   receiving a doodle operation input by the user in the drawing board interface; generating a stick figure based on a moving track of the doodle operation; and
   recommending an image meme whose similarity to a contour of the stick figure is greater than a preset threshold to the user.

2. The meme creation method according to claim 1, wherein the recognition in the preset manner further comprises emotion recognition; and
   after the speech belongs to a target emotional color, a second meme label of each image meme in the first image meme set has a matching relationship with the target emotional color.

3. The meme creation method according to claim 1, further comprising:
   displaying first prompt information, wherein the first prompt information prompts the user whether an image meme needs to be recommended based on the speech; and
   receiving an operation of recommending the image meme based on the speech that is triggered by the user.

4. The meme creation method according to claim 1, further comprising:
   displaying second prompt information in response to the operation of selecting one image meme from the first image meme set by the user, wherein the second prompt information prompts the user whether to create a speech meme or a word meme.

5. The meme creation method according to claim 1, wherein the displaying the first interface further comprises:
   displaying a dialog interface with a target contact; or
   displaying a content sharing interface; or
   displaying a comment interface.

6. The meme creation method according to claim 5, further comprising:
   sending the target meme to an electronic device corresponding to the target contact; or
   uploading the target meme to a server corresponding to an application program that provides the content sharing interface or the comment interface.

7. The meme creation method according to claim 1, further comprising:
   encoding and compressing the speech, and adding a preset identifier to a preset position of the image meme selected by the user, wherein the preset identifier indicates that the target meme is a speech meme; and
   loading, as video formats, an encoded and compressed speech and the image meme to which the preset identifier is added, to obtain the target meme.

8. The meme creation method according to claim 1, further comprising:
   converting all words corresponding to the speech or the target keyword into pixel information; and
   loading the pixel information into a preset area or a blank area of the image meme selected by the user.

9. The meme creation method according to claim 1, further comprising:
   displaying a preview interface, wherein the preview interface comprises the target meme, the preset identifier or the semantics corresponding to the speech is comprised at a preset position of the target meme, and the preset identifier indicates that the target meme is a speech meme.

10. The meme creation method according to claim 9, wherein, after the preset identifier is comprised at the preset position of the target meme, further comprising:
receiving an operation of triggering the target meme by the user; and
playing a speech carried by the target meme.

11. The meme creation method according to claim 1, further comprising:
performing preset sound effect processing on the speech, wherein the preset sound effect processing comprises at least one of male-voice processing, female-voice processing, animation figure voice processing, dialect processing, funny voice processing, or celebrity voice processing.

12. The meme creation method according to claim 11, wherein the performing preset sound effect processing on the speech further comprises:
performing preset sound effect processing on the speech based on a third meme label of the image meme selected by the user, wherein the third meme label indicates a type of the image meme selected by the user; and
after the third meme label of the image meme selected by the user indicates a preset character type, processing the speech based on a sound feature of the preset character type; or
after the third meme label of the image meme selected by the user indicates a preset animal type, performing funny voice processing or animation figure voice processing on the speech.

13. The meme creation method according to claim 1, further comprising:
receiving an operation of selecting a picture by the user; and
loading a target area in the picture to the preset position of the image meme selected by the user or the target meme.

14. The meme creation method according to claim 1, wherein, after the user does not select one image meme from the at least one image meme, further comprising: receiving an operation of selecting one image meme from locally stored image memes by the user.

15. A chip system, used in an electronic device, comprising:
one or more interface circuits; and
one or more processors, and the interface circuit and the processor are interconnected through lines; the interface circuit is configured to:
receive a signal from a memory of the electronic device, and send the signal to the processor, wherein the signal comprises computer instructions stored in the memory; and when the processor executes the computer instructions, the electronic device performs a meme creation method comprising:
displaying a first interface, wherein the first interface comprises a speech input button; receiving, in response to an operation of triggering the speech input button by a user, a speech input by the user;
recognizing the speech in a preset manner, wherein recognition in the preset manner comprises at least content recognition;
after the speech comprises a target keyword, recommending a first image meme set to the user, wherein a first meme label of each image meme in the first image meme set has a matching relationship with the target keyword; and
obtaining, in response to an operation of selecting one image meme from the first image meme set by the user, a target meme based on the image meme selected by the user and the speech or semantics corresponding to the speech;
wherein, after the user does not select one image meme from the first image meme set, further comprising:
displaying a drawing board interface in response to an operation of triggering a customized meme mode by the user;
receiving a doodle operation input by the user in the drawing board interface; generating a stick figure based on a moving track of the doodle operation; and
recommending an image meme whose similarity to a contour of the stick figure is greater than a preset threshold to the user.

* * * * *